US009026662B2

(12) United States Patent
Zhu et al.

(10) Patent No.: US 9,026,662 B2
(45) Date of Patent: *May 5, 2015

(54) PERFORMANCE INTERFERENCE MODEL FOR MANAGING CONSOLIDATED WORKLOADS IN QOS-AWARE CLOUDS

(71) Applicant: Accenture Global Services Limited, Dublin (IE)

(72) Inventors: Qian Zhu, San Jose, CA (US); Teresa Tung, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,013

(22) Filed: Apr. 9, 2014

(65) Prior Publication Data
US 2015/0012634 A1 Jan. 8, 2015

Related U.S. Application Data

(63) Continuation of application No. 13/350,309, filed on Jan. 13, 2012, now Pat. No. 8,732,291.

(51) Int. Cl.
*G06F 15/173* (2006.01)
*G06F 9/46* (2006.01)
*H04L 12/26* (2006.01)
(Continued)

(52) U.S. Cl.
CPC ............ *H04L 43/08* (2013.01); *H04L 43/0876* (2013.01); *H04L 67/10* (2013.01); *H04L 67/30* (2013.01); *G06F 9/5027* (2013.01); *H04L 29/08144* (2013.01); *G06F 9/5077* (2013.01)

(58) Field of Classification Search
CPC ............................. G06F 9/5027; G06F 9/5077
USPC ......................................... 709/226; 718/1, 104
See application file for complete search history.

(56) References Cited

U.S. PATENT DOCUMENTS 6,578,077 B1 6/2003 Rakoshitz et al.
8,239,538 B2 * 8/2012 Zhang et al. .................. 709/226
(Continued)

OTHER PUBLICATIONS

Sampai, Altino and Barbosa, Jorge G., "Last-Level Cache Interference-Aware Scheduling in Scientific Clouds", Parallel & Cloud Computing—PCC vol. 2, Iss 4, 2013 pp. 116-125, www.vkingpub.com.*

*Primary Examiner* — Aftab Nasir Khan
(74) *Attorney, Agent, or Firm* — Brinks Gilson & Lione

(57) ABSTRACT

The workload profiler and performance interference (WPPI) system uses a test suite of recognized workloads, a resource estimation profiler and influence matrix to characterize un-profiled workloads, and affiliation rules to identify optimal and sub-optimal workload assignments to achieve consumer Quality of Service (QoS) guarantees and/or provider revenue goals. The WPPI system uses a performance interference model to forecast the performance impact to workloads of various consolidation schemes usable to achieve cloud provider and/or cloud consumer goals, and uses the test suite of recognized workloads, the resource estimation profiler and influence matrix, affiliation rules, and performance interference model to perform modeling to determine the initial assignment selections and consolidation strategy to use to deploy the workloads. The WPPI system uses an online consolidation algorithm, the offline models, and online monitoring to determine virtual machine to physical host assignments responsive to real-time conditions to meet cloud provider and/or cloud consumer goals.

16 Claims, 22 Drawing Sheets

(51) Int. Cl.
*H04L 29/08* (2006.01)
*G06F 9/50* (2006.01)

(56) References Cited

U.S. PATENT DOCUMENTS

| | | | |
|---|---|---|---|
| 8,396,807 B1* | 3/2013 | Yemini et al. | 705/59 |
| 8,463,900 B2* | 6/2013 | Dasgupta et al. | 709/224 |
| 8,464,255 B2* | 6/2013 | Nathuji et al. | 718/1 |
| 8,707,300 B2* | 4/2014 | Govindan et al. | 718/1 |
| 8,909,785 B2* | 12/2014 | Franco et al. | 709/226 |
| 2003/0158930 A1* | 8/2003 | McBride | 709/223 |
| 2005/0160423 A1* | 7/2005 | Bantz et al. | 718/1 |
| 2006/0036743 A1 | 2/2006 | Deng et al. | |
| 2008/0154837 A1* | 6/2008 | Morimura et al. | 706/48 |
| 2009/0241108 A1* | 9/2009 | Edwards et al. | 718/1 |
| 2010/0205602 A1* | 8/2010 | Zedlewski et al. | 718/1 |
| 2011/0082935 A1 | 4/2011 | Zetterman et al. | |
| 2011/0131307 A1 | 6/2011 | El Bazzal et al. | |
| 2011/0153805 A1 | 6/2011 | Beninghaus et al. | |
| 2011/0302578 A1* | 12/2011 | Isci et al. | 718/1 |
| 2013/0151712 A1 | 6/2013 | O'Sullivan et al. | |
| 2014/0258539 A1* | 9/2014 | Heninger et al. | 709/226 |

* cited by examiner $R_1 = [c_1, c_2, c_3, \ldots, m_1, m_2, \ldots, d_1, \ldots, n_1]$ $d\_factor = R_1 \times M$ $= [c_1, c_2, c_3, \ldots, m_1, m_2, \ldots, d_1, \ldots, n_1] \times \begin{bmatrix} a_{11} & a_{12} & a_{13} & \ldots & a_{1i} & a_{1j} & \ldots & a_{1k} & \ldots & a_{1m} \\ a_{21} & a_{22} & a_{23} & \ldots & a_{2i} & a_{2j} & \ldots & a_{2k} & \ldots & a_{2m} \\ a_{31} & a_{32} & a_{33} & \ldots & a_{3i} & a_{3j} & \ldots & a_{33} & \ldots & a_{3m} \\ \vdots & \vdots & \vdots & \vdots & \vdots & \vdots & \vdots & \vdots & \vdots & \vdots \\ a_{i1} & a_{i2} & a_{i3} & \ldots & a_{ii} & a_{ij} & \ldots & a_{ik} & \ldots & a_{im} \\ a_{j1} & a_{j2} & a_{j3} & \ldots & a_{ji} & a_{jj} & \ldots & a_{jk} & \ldots & a_{jm} \\ \vdots & \vdots & \vdots & \vdots & \vdots & \vdots & \vdots & \vdots & \vdots & \vdots \\ a_{k1} & a_{k2} & a_{k3} & \ldots & a_{ki} & a_{kj} & \ldots & a_{kk} & \ldots & a_{km} \\ \vdots & \vdots & \vdots & \vdots & \vdots & \vdots & \vdots & \vdots & \vdots & \vdots \\ a_{m1} & a_{m2} & a_{m3} & \ldots & a_{mi} & a_{mj} & \ldots & a_{mk} & \ldots & a_{mm} \end{bmatrix}$ $d\_factor_i = \dfrac{R_1^i}{R_1}$ $R_1' = R_1 \bullet d\_factor$ $d_{c_1} = c_1 \times a_{11} + c_2 \times a_{21} + c_3 \times a_{31} + \ldots + m_1 \times a_{i1} + m_2 \times a_{j1} + \ldots + d_1 \times a_{k1} + \ldots + n_1 \times a_{m1}$ $d\_factor = [d_{c_1}, d_{c_2}, d_{c_3}, \ldots, d_{m_1}, d_{m_2}, d_{d_1}, \ldots, d_{n_1}]$ $R_1 = [80\%, 40\%, 60\%, 300, 20, 4000]$ $d_{c_1} = 80\% \times a_{11} + 40\% \times a_{21} + 60\% \times a_{31} + 300 \times a_{41} + 20 \times a_{51} + 4000 \times a_{61}$ $d\_factor = [1.063, 1.25, 1.00, 2.1, 3.3, 1.005]$ $R_1' = [85\%, 50\%, 60\%, 620, 66, 4020]$

FIG. 8

VM Specifications

| | | CPU | Mem | Disk | OS |
|---|---|---|---|---|---|
| NGSA blade | VM1 | 1 core | 2GB | 40GB | windowsXP |
| | VM2 | 1 core | 2GB | 40GB | Ubuntu11 |
| Lab blade 1 | VM3 | 1 core | 2GB | 64GB | windows7 |
| | VM4 | 1 core | 4GB | 64GB | windows7 |
| | VM5 | 1 core | 4GB | 10GB | Ubuntu10 |
| | VM6 | 2 core | 8GB | 10GB | Ubuntu10 |
| Lab blade 2 | VM7 | 1 core | 2GB | 10GB | Ubuntu10 |
| | VM8 | 1 core | 3GB | 10GB | Ubuntu10 |
| | VM9 | 2 core | 6GB | 100GB | windows7 |
| | VM10 | 2 core | 10GB | 120GB | windows7 |

FIG. 10

| Testsuite Workloads | Workload Signatures |
|---|---|
| PrimeGen | CPU – intensive |
| Dense Matrix Multiplication (SGEMM, DGEMM) | CPU – intensive |
| While loop with sleep time | CPU – intensive |
| N - body | CPU – intensive |
| Matrix Transpose | Memory – intensive |
| Sparse Matrix - vector Multiplication (SPMV) | Memory – intensive |
| Smith - Waterman | Memory – intensive |
| Random Access | Memory – intensive |
| SAXPY | Memory – intensive |
| Disk file copy & paste | Disk storage – intensive |
| Network file transfer | Network – intensive |

FIG. 11

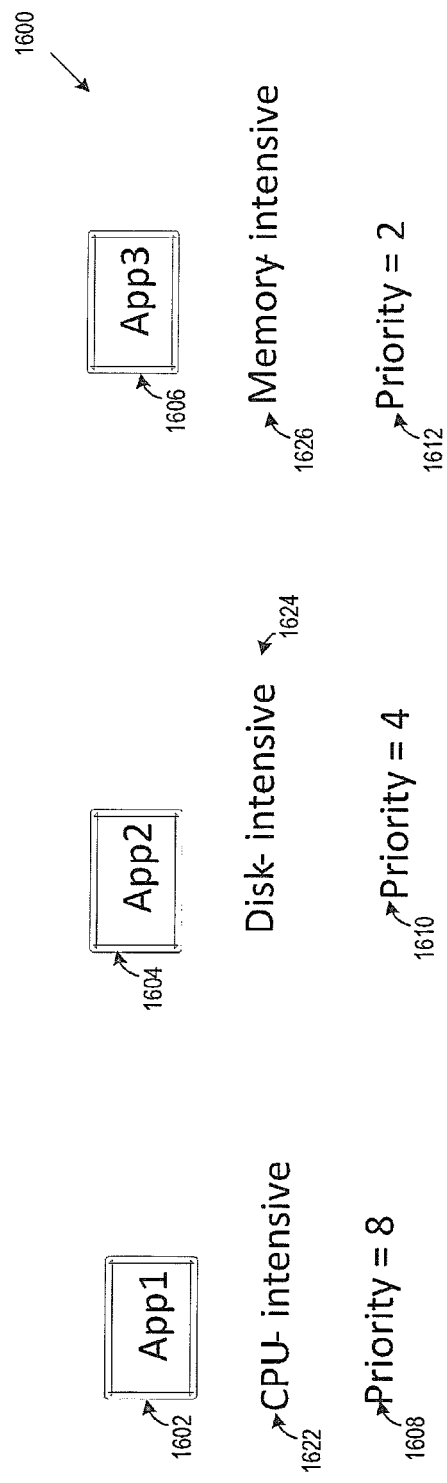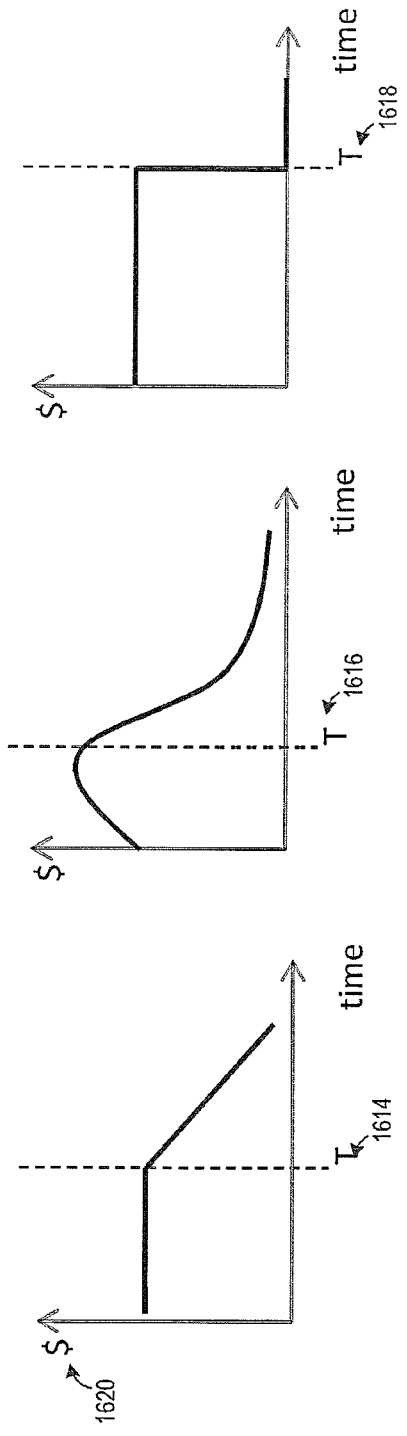
FIG. 16

PERFORMANCE INTERFERENCE MODEL FOR MANAGING CONSOLIDATED WORKLOADS IN QOS-AWARE CLOUDS

TECHNICAL FIELD

The present description relates to estimating and managing resource consumption by a consumers computing workloads, and identifying and implementing workload consolidations and resource assignment strategies that improve workload performance. This description also relates to improving the user experience and increasing revenue for the cloud provider through efficient workload consolidation strategies.

BACKGROUND

Cloud computing offers users the ability to access large pools of computational and storage resources on demand, alleviating businesses (e.g., cloud consumers) the burden of managing and maintaining information technology (IT) assets. Cloud providers use virtualization technologies (e.g., VMware®) to satisfy consumer submitted workloads by consolidating workloads and applying resource assignments. The consolidation and assignment settings are often static and rely on fixed rules that do not typically consider the real-time resource usage characteristics of the workloads, let alone the performance impact of colocated workloads. Current systems charge cloud consumers based on the amount of resources used or reserved, with minimal guarantees regarding the quality-of-service (QoS) experienced by the cloud consumers' applications (e.g., workloads) and thereby the experience of the application users. Accordingly, cloud consumers find cloud providers attractive that provide resources (e.g., adequate fraction of hardware infrastructure) to meet the maximum level of QoS guarantee for workloads of cloud consumers.

As virtualization technologies proliferate among cloud providers, consolidating multiple cloud consumers' applications onto multi-core servers improves resource utilization for the cloud providers. Existing tools use random provisioning with static rules that may lead to poor workload performance (e.g., failing to meet QoS guarantee for workloads of cloud consumers) and/or inefficient resource utilization, and perform the application profiling and resource adjustment manually. In addition, the consolidation of multiple cloud consumers' applications (e.g., workloads) introduces performance interference between colocated workloads, which significantly impacts the QoS of each consolidated users' applications workloads.

SUMMARY

The workload profiler and performance interference (WPPI) system uses a test suite of recognized workloads (e.g., a set of benchmark workloads), a resource estimation profiler and influence matrix to characterize a consumer workload that may not be recognized by the cloud provider, and affiliation rules to maximize (e.g., optimize) efficient workload assignments to meet workload QoS goals. The WPPI system may re-profile a previously profiled workload that the WPPI system does not recognize in order to infer the characteristics of the workload, because the provider may not recognize or know the consumer workload directly. The WPPI system also uses a performance interference model to forecast (e.g., predict) the performance impact to workloads of various consolidation schemes. The WPPI system uses the affiliation rules and performance interference model to determine optimal and sub-optimal assignments and consolidation schemes that may be used to achieve cloud provider and/or cloud consumer goals. The WPPI system may use the test suite of recognized workloads, the resource estimation profiler and influence matrix, affiliation rules, and performance interference model to perform off-line modeling to determine the initial assignment selections and consolidation strategy (e.g., scheme) to use to deploy the workloads. The WPPI system may also an online consolidation algorithm that uses the offline models (e.g., the resource estimation profiler, influence matrix, affiliation rules, and performance interference model) and online monitoring to determine optimal and sub-optimal virtual machine to physical host assignments responsive to real-time conditions (e.g., user demands and resources' availabilities) in order to meet the cloud provider and/or cloud consumer goals.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The workload profiler and performance interference (WPPI) system and methods for QoS-aware clouds may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 8 shows an influence matrix the WPPI system may use to calculate a dilation factor for a workload.

FIG. 10 shows virtual machine (VM) specifications the WPPI system may use to determine workload consolidations and maximize cloud provider revenue.

FIG. 11 shows test suite workloads that exhibit recognized workload profiles (workload signatures).

FIG. 16 shows soft deadlines for cloud consumer submitted applications.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
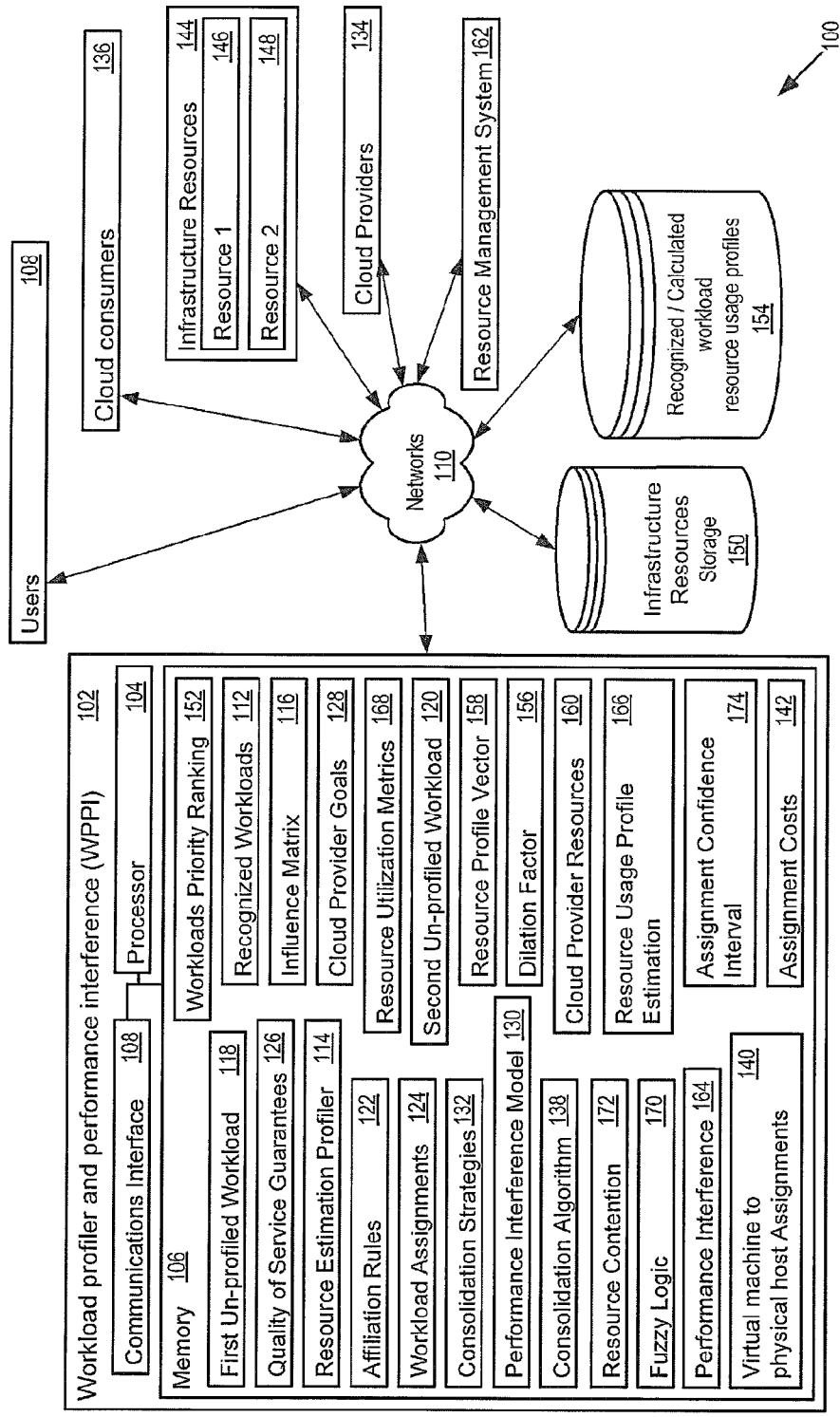
FIG. 1 shows a workload profiler and performance interference (WPPI) configuration.

FIG. 1 shows a workload profiler and performance interference (WPPI) configuration 100 that includes a WPPI system 102. The WPPI system 102 comprises a processor 104, coupled to a memory 106, that use a communication interface 108 to communicate with various components among the WPPI configuration 100 via a network 110 (e.g., the Internet). The workload WPPI system 102 uses a test suite of recognized workloads 112, a resource estimation profiler 114 and influence matrix 116 to characterize workloads (118, 120), and affiliation rules 122 to identify optimal and sub-optimal workload assignments 124 to achieve consumer Quality of Service (QoS) guarantees 126 and/or provider revenue goals 128. The WPPI system 102 uses a performance interference model 130 to forecast the performance impact to workloads (118, 120) of various consolidation schemes (e.g., consolidation strategies 132) usable to achieve cloud provider 134 and/or cloud consumer 136 goals (126, 128), and uses the test suite of recognized workloads 112, the resource estimation profiler 114 and influence matrix 116, affiliation rules 122, and performance interference model 130 to perform off-line modeling to determine the initial assignment 124 selections and consolidation strategy 132 to use to deploy the workloads (118, 120). The WPPI system 102 uses an online consolidation algorithm 138, the offline modeling tools (114, 116, 122, 130), and online monitoring to determine virtual machine to physical host assignments 140 responsive to real-time conditions to meet cloud provider 134 and/or cloud consumer 136 goals (126, 128).

The WPPI system 102 may adjust affiliation rules 122 to balance the goals 126 of the cloud consumers 136 with the goals 128 of the service provider 134. Maximizing the revenue of the provider may be calculated as the fee collected for running a workload (118, 120) and meeting the QoS guarantee 126 less the cost 142 to provide the hardware infrastructure resources (144, 146, 148, 150, 160) used to meet the QoS guarantee 126. Cloud consumer 136 may pay a premium to influence the implementation of one or more affiliation rules 122. Alternatively, rather than paying an amount of money as a premium, the cloud consumer 136 may value the cloud consumer's workloads (118, 120) to identify a priority ranking 152 for the workloads for the cloud consumer 136.

Historically, monitoring during runtime when multiple applications are in use, when two applications are observed that exhibit resource contention issue then a rule is set that indicates the applications should be separated from using the same resources. Oftentimes such observed exhibit resource contention and rule setting may be made by a human-in-the-loop. In contrast, the WPPI system 102 uses the performance interference model 130 to automatically determine the workload types (118, 120, 112, 154) that may be optimally executed using the same or different hardware infrastructure resources (144, 146, 148, 150, 160). The interference model 130 provides an estimated dilation factor 156 (e.g., a multiplier that indicates a degradation in performance that may be represented in terms of a percentage of performance interference 164 that results from executing multiple workloads together) for multiple workloads (118, 120, 112, 154) analyzed for execution together using the hardware infrastructure resources (144, 146, 148, 150, 160). The WPPI system 102 applies the dilation factor to the resource usage profile that WPPI system 102 translates into the required resources needed to preserve QoS guarantees that include the time to process or the accuracy (e.g., using the resource-time relationship regressed from training).

In addition to time as a QoS metric, QoS metrics may also include other metrics such as accuracy of the work (e.g., in Monte Carlo simulation when not enough resources are provided then after a fixed amount of time the simulation would be less accurate than in the case where the required dilated resources are assigned). Time, as a QoS metric, may also apply to the time required for a transaction to complete, a request to be processed, or a batch job to complete. The dilation compares the QoS of the workload running on a machine alone to the required resources needed to preserve the same QoS when that workload is operating in a shared collocated environment.

In contrast to historical performance interference models that measure CPU or last level cache of memory required by multiple workloads, the current performance interference model 130 provides quantitative analysis across multiple types of resources (e.g., CPU, cache, network bandwidth, storage) (144, 146, 148, 150, 160) used for multiple workloads (112, 118, 120), and time variant features of those hardware infrastructure resources (144, 146, 148, 150, 160) used to meet the QoS guarantees 126 of multiple permutations of workloads. The workload resource utilization profile may be represented as a time series resource profile vector 158 so that for example two workloads (118, 120) identified as CPU intensive may be combined to use a CPU because the time series CPU utilization of the respective two workloads (118, 120) require the CPU at different times.

For example, where a first workload 118 and a second workload 120 are colocated to execute using the same set of physical resources (144, 146, 148, 150, 160), the dilation 156 indicates how the workloads (118, 120) may interfere with each other. The WPPI system 102 captures this interference as the additional amount of physical resources needed to execute both workloads on top of those resources needed for executing the single workload on its own.

For example, when a workload 'A' needs 10% resources on its own, and B needs 10% on its own, but when combined then 'A' needs 15% and 'B' needs 12%. In this example, the dilation factor for 'A' is 1.5 due to collocation with 'B', and 1.2 dilation factor for 'B' due to 'A'. The workloads, 'A' and 'B', together consume 27% of the physical resources when collocated. Applying the same logic, the interference with a group of other workloads is captured by the amount of additional physical resources needed for executing all workloads (e.g., the subject workload and the other workloads from the group) simultaneously on top of those resources needed for executing the single workload alone.

When physical resources cannot accommodate the additional dilation factor for a workload, then the result of the interference is a degraded QoS that may include performance degradation, loss of accuracy, or additional delay in time for jobs, transactions, or workloads. The WPPI system 102 may not relate the consolidation scheme directly to QoS metrics. The WPPI system 102 maps the consolidation scheme to the application resource usage profile (through the dilation factor) used to predict the QoS metrics using the prediction model.

For example, where a first application (e.g., workload 118) is CPU-intensive and a second application (e.g., workload 120) is Memory-intensive, co-locating the first application and second application to use the same server (e.g., resource 146) will result in an increase in the total amount of physical resources needed (e.g., a dilation value 156) used as a multiplier in the form of a percentage increase in the resources needed to execute the workload of the first application.

The dilation factor is a multiplier to the metrics in the resource usage profile, and the WPPI system 102 adjusts the resource usage profile using the dilation factor then the WPPI system 102 uses the new profile to predict the application performance. For example, the resource required $R_o$ by the first application when operating alone is impacted when a second application is assigned to the same server increases by a 15% dilation (156) to an amount of resources required $R_1$ calculated as $R_o$ multiplied by the dilation (156) of 1.15 or $R_o \times 1.15 = R_1$, the resource needed by the first application when the first application and a second application are colocated to use the same underlying physical resource. The resource ($R_o$) used by the first application would be dilated to $R_1 = 1.15 \times R_o$, here 1.15 is the dilation factor, and the dilation factor, $R_o$, and $R_1$ are scalars.

Generally, the dilation factor may be a vector of the same dimension as the resource metrics so there is one dilation value per resource metric. For example consider the dilation factor vector (e.g., 1.15 and 1.05) where the first resource metric is dilated by 15% and the second by 5%. The resource vectors may be functions of time or a time series (e.g., R0(t)). The WPPI system may train a function to map the resource usage to execution time. When the WPPI system updates the resource usage profile, the WPPI system plugs the resource usage profile into the resource-time relationship for estimating the new application execution time. The affiliation rules 122 use the dilation 156, workload types (118, 120, 112, 154), and permutations of mappings (e.g., consolidation strategies 132) of workload types to resources (144, 146, 148, 150, 160) in order to determine the optimal mappings to satisfy the QoS guarantees 126 of the workloads and improve revenue goals 128 of the provider 134. Applying the dilation 156 multiplier to the resource profile vector 158 for each workload type (118, 120, 112, 154), identifies optimal mappings of combinations of workloads and resource mappings (e.g., consolidation strategies 132) that satisfy the QoS guarantees 126 of the workloads. Given the types of workloads exhibited by the workloads (118, 120, 112, 154), the WPPI system 102 provides optimal mappings using affiliation rules 122 to determine combinations of workloads and resource mappings that satisfy the QoS guarantees of the workloads.

The WPPI system 102 uses the off-line analytics to configure the initial deployment (140) of the workloads and monitor changes to the workload over time (e.g., a workload profile may change workload types over time). The resource estimation profiler 114 uses a time series approach to forecast the workload profiles. For example, a workload (118, 120, 112, 154) may have seasonal profiles (e.g., holiday retail shopping versus summer transactions for a web server application).

In contrast to the WPPI system 102, current virtualized environment (e.g., a web server farm) monitoring systems (e.g., a VMware® system) monitor workload performance in real-time without the benefit of off-line analytics provided by the workload profile as proposed. These current virtualized environment monitoring systems react in real-time and make adjustments (e.g., re-balancing workloads in a reactionary fashion) based on demand. However, after current virtualized environment monitoring systems rebalance workloads, the provider may still observe the utilization of resources (e.g., virtual machines VMs) changes for the workloads over time (e.g., time series factors) without anticipating such changes automatically and/or sufficiently in advance to proactively make adjustments. Accordingly, current virtualized environment monitoring systems do not provide the same level of resource provisioning as offered by the WPPI system 102.

The WPPI system 102 tunes resource estimations in real-time (e.g., where the workload profile changes when the application is executed on-line). Workloads may include web server applications, database servers, application servers, and batch jobs. The WPPI system 102, in on-line mode, initiates the deployment of submitted workloads (118, 120), and the WPPI system 102 applies the models (e.g., the resource estimation profiler model 114, the performance interference model 130, influence matrix 116, and the affiliation rules 122) to initiate execution of the workloads (118, 120) that are then tuned in real-time using the historical resource estimation profile 166 adjusted by a real-time characterization of the workloads (118, 120). During the on-line mode, a workload's profile (e.g., resource usage profile estimation 166) is recalibrated using real-time data and the workload signature may be revised and/or updated accordingly. The resource estimation profile 166 for the workloads and the resources (e.g., hardware infrastructure resources—a server fails over to another server) used by the workloads (118, 120) may change during the on-line mode. Accordingly, during the on-line mode, the affiliation rules 122 map (e.g., virtual machine to physical host assignments 140) resources (144, 146, 148, 150, 160) in real-time to a set of compute demands (e.g., the workloads demand for number of CPUs, RAM and cache memory and disk storage, and network bandwidth). The resources (144, 146, 148, 150, 160) may change in the amount (capacity) and types (characteristics) of resources available to which to map the compute demands. However, because the WPPI system 102 pre-computes the variations of resources, during the off-line mode, to which to map the workloads (e.g., compute demands) the WPPI system 102 adapts immediately and efficiently to changes in the amount (capacity) and types (characteristics) of resources available to which the affiliation rules map the compute demands.

The cloud consumer 136 may influence the optimization functions performed by the WPPI system 102 to identify the affiliate rules mappings to use depending on whether the objective is to accommodate as many workloads as possible, or based on some weighting applied to the workloads submitted by the cloud consumers 136 to identify a preferred ranking priority ranking 152) of the workloads, in order to identify resource mapping that maximize revenue to the cloud provider based on the workloads executed by the cloud providers resources.

The WPPI system 102 provides a performance interference model that the cloud provider may use to optimize revenue and to improve resource utilization. A cloud consumers workload (118, 120) (e.g., application) may comprise multiple dependent services, each of which may be mapped into an individual VM (140). The WPPI system 102 may evaluate one or more Quality-of-Service (Qos) metrics 126 (e.g., response time) of the cloud consumer's workload (e.g., application). The cloud consumer 136 and/or the WPPI system 102 assign a value to the provider 134 if the application is completed before the workload's deadline (126). Historically resource management systems considered the performance degradation due to resource contention caused by consolidating multiple applications onto a single server. However, the WPPI system 102 provides a way to identify performance interference 164 experienced by multiple workloads (e.g., two I/O-intensive applications) colocated to share the use of resources (e.g., I/O resources, memory and/or last-level cache). Resource usage (166) for a workload is time-variant due to the dynamics of the workload over time. When the workloads compete for the same type(s) of resources, whether the performance of multiple colocated applications (e.g., workloads 118, 120) may be impacted significantly depends on the characteristics of the resource usage profile (158, 166) of the workloads (e.g., workload profiles 158, 166). For example, the WPPI system 102 may use the resource usage estimation profile 166 to determine whether to consolidate workloads (118, 120) because the workloads' respective peak resources utilization (126) peaks at different times.

The cloud provider 134 accepts cloud consumer submitted workloads (118, 120) for execution using in the resources (144, 146, 148, 150, 160) of the cloud provider 134. The cloud provider 134 may attempt to accommodate as many workloads as possible, while meeting the QoS guarantees 126 for each of the cloud consumers 136. The cloud consumer's QoS requirements 126 may include deadlines to complete particular jobs or tasks, number of CPUs, amount of memory, actual resources used in a particular amount of time.

The WPPI system 102 provides cloud providers 134 a way to deliver higher guarantees of QoS 126 for consumer workloads while improving the efficiency of resource assignments (140) used to satisfy the QoS guarantees 126 for the consumer 136 workloads (118, 120). The workload profiler 114 automatically characterizes consumer-submitted workloads (118, 120), and optimizes the workload-to-resource allocations (138, 140) needed to meet guarantees of QoS 126 for the consumer 136 workloads (118, 120). The WPPI system 102 uses the workload resource estimation profiler 114, affiliation rules 122 and the performance interference model 130 with the influence matrix 116, and may provide automated provisioning of workloads (118, 120). The WPPI system 102 performs real-time adjustments on consolidation configurations (124, 132, 140) online in order to achieve better resource utilization, and thereby, allows the cloud provider 136 to optimize resource utilization (e.g., avoid resource costs 142 due to inefficient resource utilization and execute workloads to improve the provider's revenue).

The cloud provider 134 may not know the expected workload (e.g., demand) or the workload resource usage profile 166 of the cloud consumer's workload until the cloud consumer 136 submits the workload (118, 120) for execution by the cloud provider's resources. The WPPI system 102 provides the cloud consumer 136 a way to estimate (e.g., model) the workload resource usage profiles 166 for the workloads submitted and map (124, 132, 140) the submitted workloads to actual physical resources (144, 146, 148, 150, 160). The WPPI system 102 applies affiliation rules 122 to determine the resource-to-workload mappings (140, 122, 132) to identify optimal and sub-optimal mappings that satisfy one or more functions (126, 128). For example, the WPPI system 102 uses models (114, 130, 116) and the affiliation rules 122 to optimize the number of QoS guarantees 126 of workloads that are satisfied or when a cost is associated with each workload then optimize the revenue (e.g., 128) that may be generated from processing the workloads. Optimizing the number of workloads may include equally weighting the workloads' priority values, or weighting the workloads' priority values (152) based on the revenue that may be generated from processing each workload, or a combination.

The WPPI system 102 uses an off-line mode and on-line mode to determine optimal resource mappings for the cloud consumers' workloads before deployment on assigned (140) provider resources (144, 146, 148, 150, 160), and responsively adjust resource assignments (124, 132, 140), consolidation and migration decisions during runtime. The WPPI system 102 performs analysis to train one or more models (e.g., a workload resource estimation profiler 114 model, a performance interference model 130, influence matrix 116, and affiliation rules 122) to determine for each cloud consumer submitted workload (118, 120) the optimal and sub-optimal resource mappings (124, 132, 140) to use to meet QoS guarantees 126 and/or provider revenue goals (128).

Instead of server-centric based provisioning, the workload resource estimation profiler 114 model identifies the resources (e.g., a server exhibiting certain characteristics, capacity and/or capabilities) to meet service-centric QoS metrics 126. The WPPI system 102 uses one or more models to forecast changes in the nature and character of the cloud consumer's workloads, the users' demand and cloud resource availability. The workload resource estimation profiler 114 model provides the ability to estimate the consumer submitted workload (118, 120) in terms of resource usage based on monitored data. The workload resource estimation profiler 114 model characterizes the workloads (118, 120) submitted by the cloud consumers 136 as the workloads utilize resources (e.g., resource utilization metrics 168) across time (e.g., utilization of CPU, memory, disk, and network). The cloud provider 134 may not know the workload (118, 120) in advance or information necessary to characterize the workloads (118, 120). The workload resource estimation profiler 114 model characterizes each workload in order to determine resource utilization requirements by monitoring the workload as the WPPI system 102 processor executes (e.g., tests and/or models) the workload. The workload resource estimation profiler 114 model calculates a resource profile vector 158 for each workload based on the resources consumed and how (e.g., the manner in which) the resources are consumed. The workload profile (166) may be represented as a time series resource profile vector (158) that provides resource utilization characterizations (e.g., average CPU usage, or a maximum CPU usage and a minimum CPU usage) and time to complete jobs or tasks for the workload. The resource profile vector (158) provides a workload signature that identifies the one or more resources important to achieving the QoS guarantee 126 for the workload (e.g., using the influence matrix to identify one or more important resources). The workload signature may identify the CPU, network bandwidth, memory, or a combination of provider resources as important (e.g., resources exhibiting sensitivity and/or influencing the outcome of achieving the QoS guarantee for the workload). The workload profiler 114 characterizes the workload by identifying the resources to achieve the QoS guarantee 126 for the workload, and the metrics (e.g., resource utilization metrics 168) to instrument and measure in order to ensure the QoS guarantee 126. The number and type of metrics (e.g., resource utilization metrics 168) measured may vary in order to identify the sufficiently significant statistics used to characterize the workload signature (e.g., as CPU intensive, network bandwidth intensive, or memory intensive, or a combination thereof).

Using the workload profiles 166, affiliation rules 122 may automatically assign (214, 132, 140) workloads to hosts (e.g., resources). The WPPI system 102 trains the affiliation rules 122 using a test suite of recognized workload "benchmarks" which cover a spectrum of different resource usage profiles (e.g., CPU-intensive, memory-intensive, disk storage-intensive, network-intensive). Fuzzy logic 170 formulates each affiliation rule by calculating a confidence level for each affiliation rule. A confidence level with a higher probability indicates more confidence that by applying the resource mapping specified by the respective affiliation rule will achieve the QoS for the respective workload.

The WPPI system 102 determines optimal and sub-optimal workload consolidations (e.g., assigning multiple workloads to share resources) to reduce the number of resources (e.g., servers, CPUs, storage, network bandwidth) and improve provider efficiency (e.g., maximize cloud provider profits). A performance interference model identifies how workloads (e.g., same and/or different workload types) interfere (e.g., dilate or degrade performance) with each other due to resource contention 172 caused by consolidation. The performance interference model calculates a dilation factor that identifies the consumer's workload resource usage (e.g., servers, CPU, memory, network) to achieve the QoS metrics when the workload is consolidated with one or more workloads. The WPPI system 102 uses the workload resource estimation model, the influence matrix, the affiliation rules and the performance interference model to determine offline initial mapping of assignments of workloads to physical resources (e.g., cloud provider servers).

The WPPI system 102 may use an online consolidation algorithm to tune the assignments during run-time to maintain unexpected variance resulting in workload performance degradation. Because the workload resource estimation model may rely on monitored real-time usage, the characterization (e.g., workload type) determined for a workload may not be accurate for unpredictable or new workloads. The WPPI system 102 (e.g., using the consolidation algorithm) searches for consolidation configurations to optimize the provider's revenue and/or maximize the number of workloads submitted that achieve QoS guarantees. Using the real-time data as input to the WPPI system, the WPPI system 102 may responsively make adjustments (e.g., re-characterize the workload type, and/or move the workload to another colocation, or migrate to another cloud provider's resources) when the WPPI system 102 determines that the workload consolidation configuration fails to achieve the QoS guarantees or has a low probability of achieving the QoS guarantees for the workload. The WPPI system 102 provides one or more optimal assignments (132), as well as sub-optimal assignments, to assign workloads to physical resources (e.g., hosts) (140) for deployment during runtime with virtualization tools (e.g., VMware®) (162).

The cloud consumer 136 may specify and/or the WPPI system 102 may determine a workload's demand (e.g., workload resource estimation profile, and workload type) and the cloud provider 134 may use the workload resource estimation profile to determine how to fulfill the service requirements (e.g., QoS guarantees). The WPPI system 102 assists improving the communications between the consumer 136 and the cloud provider 134 in order to provide a win-win situation. The WPPI system 102 provides a way to profile workloads submitted by cloud consumers so that the cloud provider 134 may anticipate the estimated application resource utilization (166), and the affiliation rules may be applied responsive to the workload to identify an optimal deployment and workload consolidation and/or migration strategy.

The WPPI system 102 provides a performance interference model that analyzes the resource utilization contention resulting from co-locating multiple workloads, different types of workloads, as well as the time-variant characteristics of those workloads. The WPPI system 102 may interface to provider resource management systems (e.g., VMware® tools) and the WPPI system 102 uses recognized workloads to calibrate the models of the WPPI system 102.

Figure 2:
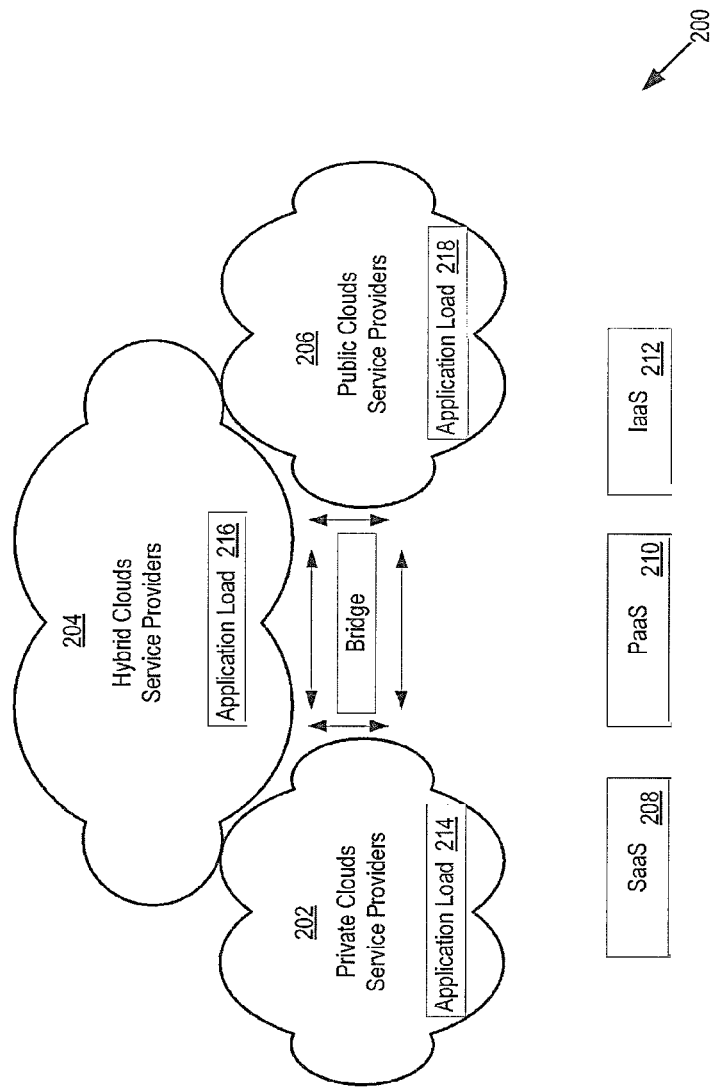
FIG. 2 shows types of cloud providers the WPPI system may identify for consolidating cloud consumers' workloads (e.g., applications).

FIG. 2 shows types of cloud providers (202, 204, 206) the WIP system 102 may identify for consolidating and/or migrating cloud consumers' workloads (e.g., applications). The types of cloud providers (202, 204, 206) may provide software as a service (SaaS 208), platforms as a service (PaaS 210), or infrastructure as a service (IaaS 212), or a combination thereof. The workload profiler 114 provides cloud consumers workload predictions, resource usage profiles for the workloads (application loads 214, 216, 218), and confidence intervals (174) for achieving QoS metrics. The workload profiler 114 provides cloud providers a way to estimate the resource consumption of consumer 136 workloads (e.g., identify cloud computing bottlenecks), predict the implication of consolidation (e.g., using a trained performance interference model) and resource assignment strategies (e.g., affiliation rules) on workload performance, improve the service experienced by the provider's consumers, and increase the provider's revenue through efficient workload consolidation and migration strategies (e.g., real-time responsive to rebalancing and scaling the workloads).

The workload profiler 114 may automate the consolidation of application workloads within a cloud environment for cloud providers. The workload profiler 114 includes a performance interference model that estimates the application performance degradation that may result when multiple workloads are colocated (e.g., placed on a single physical server). The workload profiler 114 combined with an optimization search algorithm (e.g., 138) used in real-time, allows cloud providers to maximize revenue and resource utilization, and strengthen the cloud providers' competitive capabilities and market position among other cloud providers.

A cloud consumer 136 provides one or more applications (e.g., a set of applications—workloads) to the WPPI system 102. Each application (e.g., workload) may include a series of dependent services that could be either data-oriented (e.g., a service may not start until receiving data from another service) or control-oriented (e.g., a service may not start until the completion of another service). Each service exposes different resource usage characteristics (e.g., CPU-intensive, memory-intensive, disk-intensive and network-intensive). The amount of workload processed by each application may be dynamic and impact the resources consumed by the application as a result. Each application (e.g., workload) is associated with a deadline (e.g., hard or soft deadline) and a job completion value that indicates whether the job (e.g., workload) completes within the job's deadline. The cloud consumer 136 may assign each application a priority value that identifies the importance of the application (e.g., workload) to the user. An application (e.g., workload) identified as an important application may require completion without exceeding the deadlines of the workload, because the important applications may have the potential to improve and/or increase the revenue to the cloud provider. The importance of an application's completion time may also be captured by a utility function that assigns completion time t to values >0 that indicate a weight of how important completed by a time t. The resource capacity, pricing policy, virtual machine (VM) starting time, VM scheduling, as well as affiliation rules of the cloud providers may vary. As a result, cloud providers provide different levels of confidence for hosting different types of applications (e.g., workload). The workload profiler 114 analyzes the application QoS execution time, as well as other application QoS areas, to maximize cloud provider 134 revenue and improve the resource utilization of the cloud provider's resources.

The extent of degradation to a user's application depends on the combination of applications that are colocated with the user's application. For an effective consolidation policy, the workload profiler quantifies the level of interference that may result among applications and/or VM's.

The WPPI system 102 uses an influence matrix to estimate the performance interference due to resource contention 172, and uses a resource usage profile to predict the performance degradation upon consolidation of the user's application with other colocated applications. The WPPI system 102 includes a performance interference model that considers all types of resource contention 172, as well as the correlation across different types of resources. Furthermore, each metric in the resource usage profile is represented as a time series to represent the time-variant feature of the resource usage.

The WPPI system 102 may forecast (e.g., predict) the performance of consolidated (e.g., colocated) applications in order to generate an adjusted resource usage profile for a workload by using the influence matrix to map the impact of resource contention 172 from a newly added application to the consolidation as a dilation factor to the resource usage of the current application. The WPPI system 102 uses the resource usage to forecast (e.g., predict) the application performance with colocated applications through a regressed function.

While training phase the WPPI system, the WPPI system 102 may analyze a test suite of applications (e.g., recognized workloads) individually on a dedicated VM on a single physical server. The WPPI system 102 analyzes the resource usage data and application execution time of the workloads. The WPPI system 102 may input data (e.g., fit data via an iterative process of adjustments) into a support vector machine (SVM) regressor in order to model the relationship between resource usage and execution time for a workload. The WPPI system 102 uses metrics filtered to reduce the regression complexity of the regression. The WPPI system 102 consolidates (colocates) the applications in the test suite. The WPPI system 102 measures the degraded performance if any and the resource usage profile that results from a consolidation of the workload with one or more other workloads.

For example, where App1 and App2 represent two colocated applications (e.g., workloads), and $M^j_i$ is the $i^{th}$ metric in the resource profile from APPj, the WPPI system 102 analyzes the ratio of each pair of $M^1_i$ and $M^2_k$. The metric values are used to regress against the change of the same metric (e.g., CPU, memory, storage, or network bandwidth/throughput) before and after the consolidation of the workload with one or more other workloads. The regression coefficients compose the influence matrix that estimates the change (e.g., dilation—performance interference) in the resource usage metric for the application considering the colocated application. The WPPI system 102 adjusts the resource usage profile to forecast (e.g., predict) the application's slow-down due to consolidation. The WPPI system 102 may optionally use a recognized workload that emulates a web server (e.g., SPECWeb2005™) to evaluate and determine the effectiveness of the model, and confirm that the performance estimation error is less than a configurable performance estimation error threshold (e.g., 8% performance estimation error).

Cloud computing provides an unprecedented opportunity for on-demand computing. However, each party (e.g., cloud consumer 136 and cloud consumer) faces different goals in the provider-consumer information technology (IT) model. Cloud consumers face the choice of using multiple cloud providers to satisfy the demands of workloads for cloud consumers. Cloud providers strive to provide the best service to attract as many consumers as possible. In the typical provider-consumer model neither party has full information. In fact, both parties may have hidden information needed for the other to make the best decision. Consumers do not have access to the current resource status of hosts on the provider side. The consumer 136 may not control where to deploy the workloads of the consumer, even though the consumer 136 may have better knowledge of the impact of resource consumption on the applications' Quality-of-Service (QoS). The provider's deployment and scheduling strategy may be more efficient with knowledge of the consumer's resource usage.

For example, consider a scenario where a consumer 136 submits a workload that sometimes exhibits disk-intensive characteristics. Without knowing the workload type prior to execution, a cloud provider 134 might deploy the workload with another workload that is heavily disk loaded. Performance degradation for both workloads during periods of disk I/O contention may result from such assignment. Currently, cloud providers provide limited guarantees which results in performance degradation for the consumer 136 or over-provisioning which may lead to inefficiencies for the provider. The WPPI system 102 provides insight to the provider so that the provider may avoid co-locating workloads that peak at the same time or exhibit other contention issues (e.g., performance degradation), and improves performance experienced by the consumer 136 while optimizing his resource use.

Figure 3:
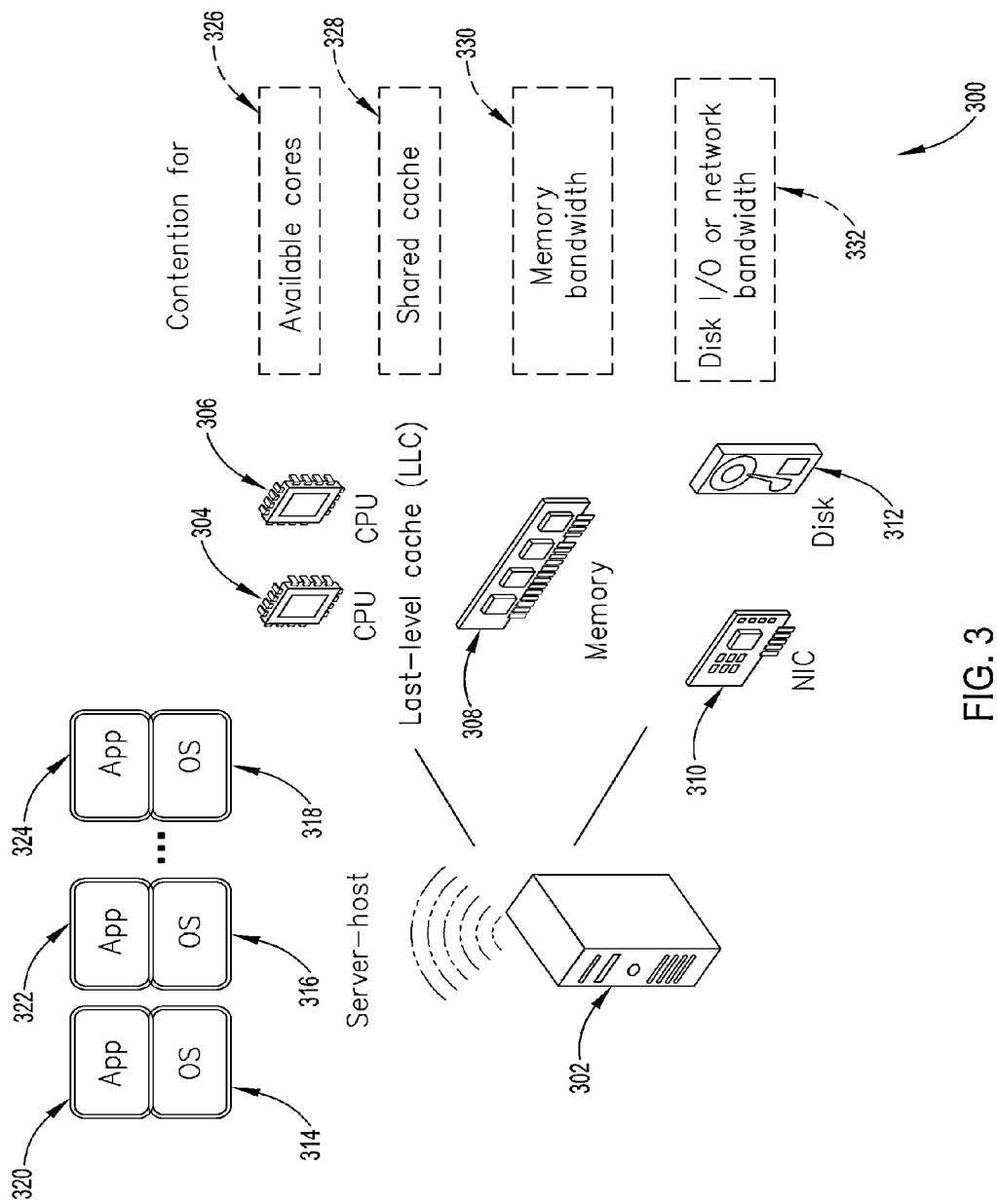
FIG. 3 shows the types of resources and resource contentions the WPPI system may analyze.

FIG. 3 shows the types of resources (host 302, CPUs 304 and 306, memory 308, network interface cards—NIC 310, disk storage 312, and operating systems 314, 316, 318) and resource contentions (172, 326, 328, 330, 332) the WPPI system 102 may analyze when determining a consolidation strategy for applications (e.g., workloads 320, 322, 324). The WPPI system 102 determines optimal and sub-optimal resource mappings for the workloads. The cloud provider 134 may receive the WPPI system 102 consolidation strategy and implement the consolidation strategy (e.g., co-locating multiple applications hosted on a multi-core server through virtualization technologies) to improve server resource utilization, maximize cloud provider 134 revenue, and reduce resource cost. The WPPI system 102 consolidation strategy provides each application resource assignments that the application may consider as the application's own stack of resources. The WPPI system 102 responsively calculates in real-time consolidation adjustments as the resources can be dynamically adjusted among colocated applications.

Figure 4:
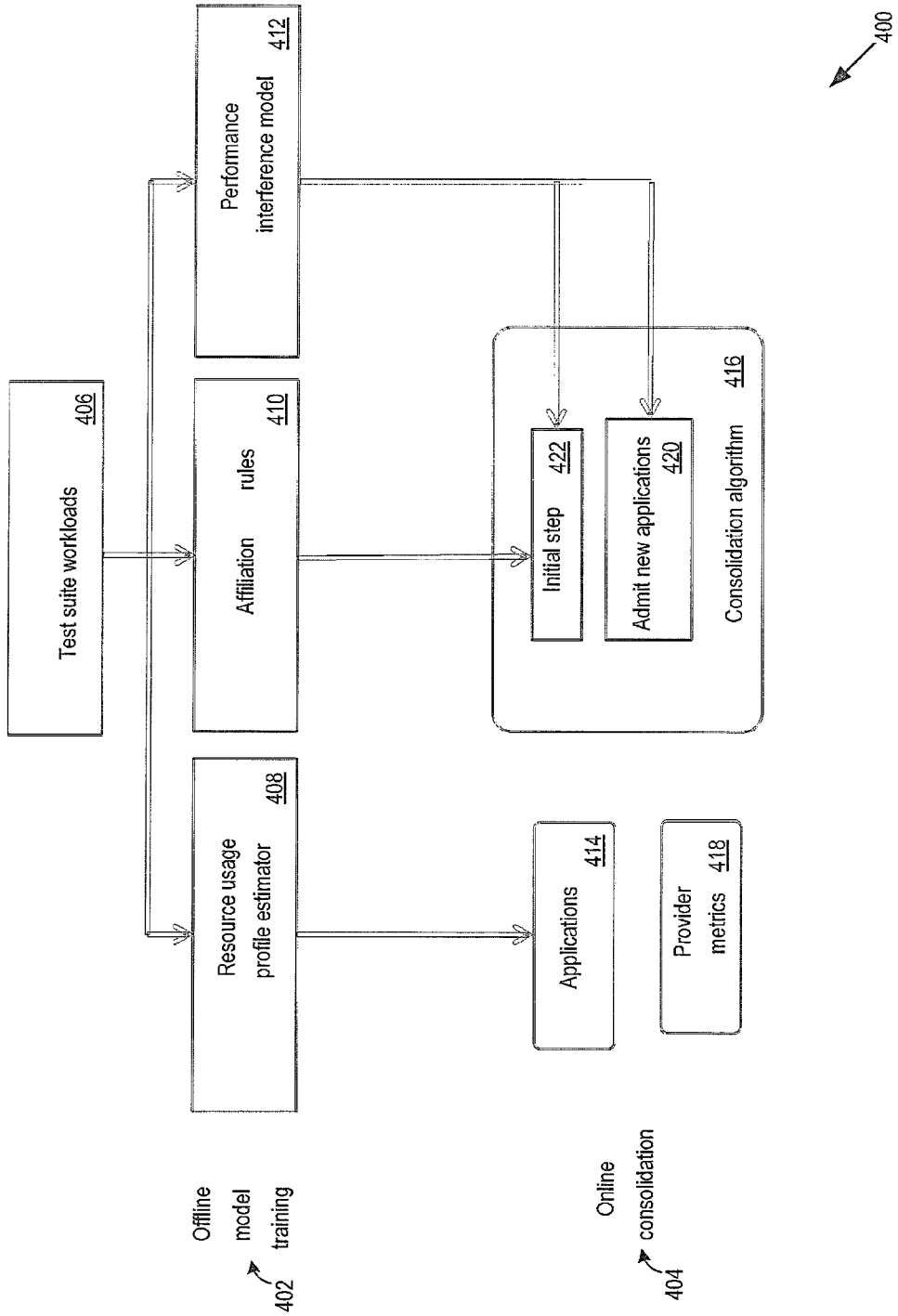
FIG. 4 shows a flow diagram of logic used by the WPPI system to determine workload performance interference and consolidation schemes.

FIG. 4 shows a flow diagram of logic 400 used by the WPPI system 102 to determine workload performance interference (164) and consolidation schemes (e.g., strategies 132) for one or more consumer 136 cloud workloads (e.g., applications 414). The WPPI system 102 provides multiple operating modes, including offline model training 402, and online (404) deployment and consolidation of workloads. During the offline training 402, the WPPI system 102 collects data to train the WPPI system 102 models using a test suite recognized workloads 406, including a resource usage profile estimator 408, an affiliation rules model 410, and performance interference model 412. The resource usage profile estimator 408 estimates the infrastructure resources (e.g., CPU, memory, disk, and network capacities and capabilities) utilization for the workload. The WPPI system 102 uses the affiliation rules 410 to identify permutations of resource mappings (e.g., optimal and sub-optimal mappings) for the cloud consumer's application(s) (e.g., workloads). The WPPI system 102 uses the performance interference model 412 to predict the application performance degradation (e.g., dilation) due to consolidation (e.g., co-location of workloads). During the online 404 consolidation phase (e.g., deployment of the workloads on physical resource of the cloud provider) (422), the WPPI system 102 provides a distribution strategy (e.g., mappings workloads onto hardware infrastructure resources) for the applications (e.g., workloads). The WPPI system 102 may use a search algorithm (e.g., consolidation algorithm 416) to optimize revenue and reduce resource cost (418) (e.g., identifying cloud providers' resources to map the cloud consumers' submitted workloads). When the WPPI system 102 receives new applications (420) (e.g., workloads) submitted by consumers, the WPPI system 102 determines the optimal and sub-optimal mapping permutations for the workloads. The WPPI system 102 may interface to a resource management system (162) of the provider to deploy the consolidation strategy (e.g., mapping one or more workloads onto servers) based on the WPPI system 102 trained models. However, when a proposed consolidation configuration violates an application's deadlines (e.g., fails to satisfy the QoS guarantees of the workloads) the WPPI system 102 may identify a migration destination (e.g., another cloud provider's resources) that satisfies the QoS guarantees of the workloads.

Figure 5:
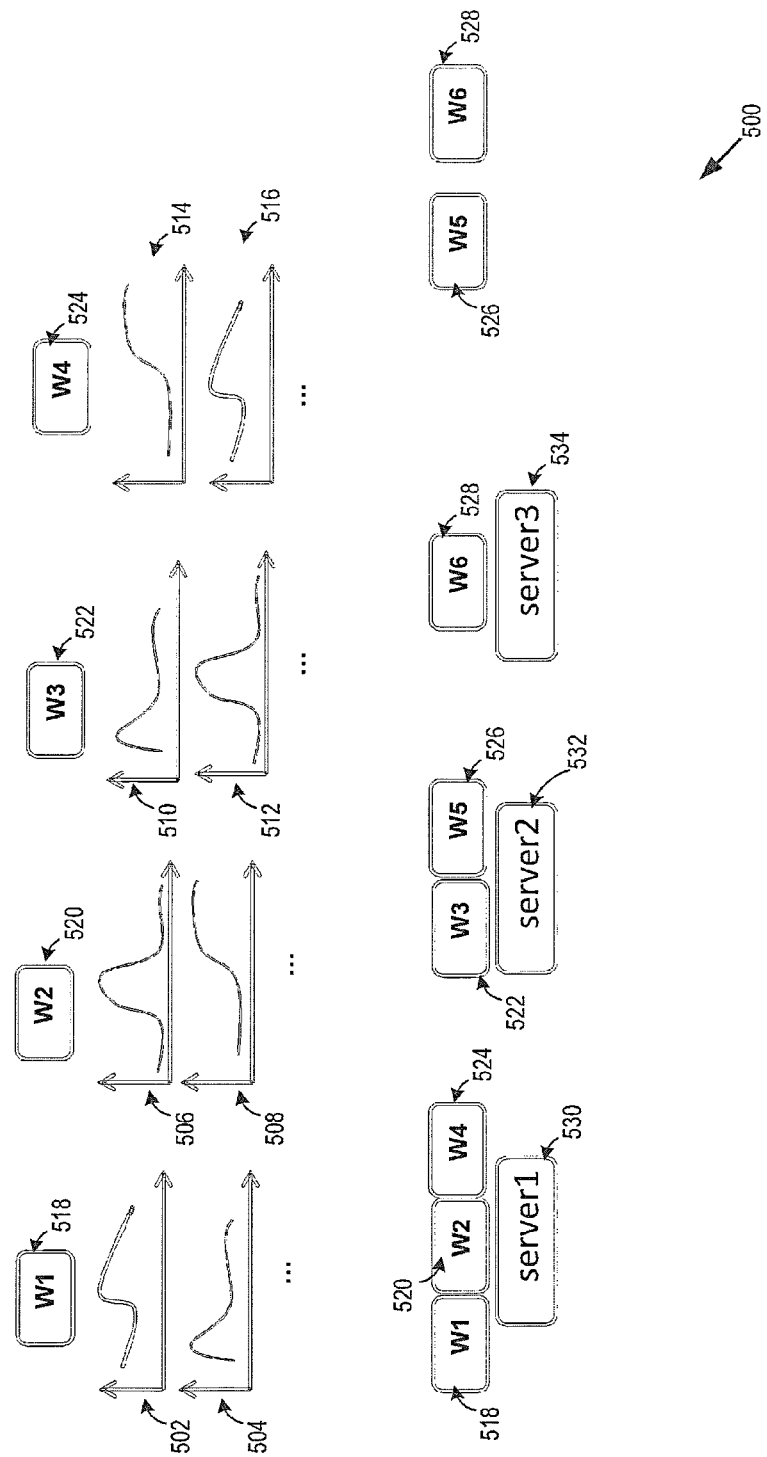
FIG. 5 shows a graphical representation of the workload profiles the WPPI system determines to optimize workload consolidation and resource utilization.

FIG. 5 shows a graphical representation 500 of the workload profiles (e.g., time series vectors characterizing the workloads—502, 504, 506, 508, 510, 512, 514, 516) the WPPI system 102 may determine to optimize workload consolidation (518-520-524, 522-526, 528) and resource (530, 532, 534) utilization. The behavior of a workload (e.g., application) may be different when no users (e.g., behavior 502, 506, 510, 514) are interacting with the workload versus when one or multiple users (e.g., behavior 504, 508, 512, 516) are interacting with the workload. The behavior of the workload (e.g., application) may appear different to the cloud provider 134 based on the resource demands of the workload. The workload profiler 114 determines a workload profile 166 for an un-profiled workload including the type of workload profile the workload exhibits (e.g., the workload signature as CPU intensive, network bandwidth intensive, memory intensive, or a combination).

Figure 6:
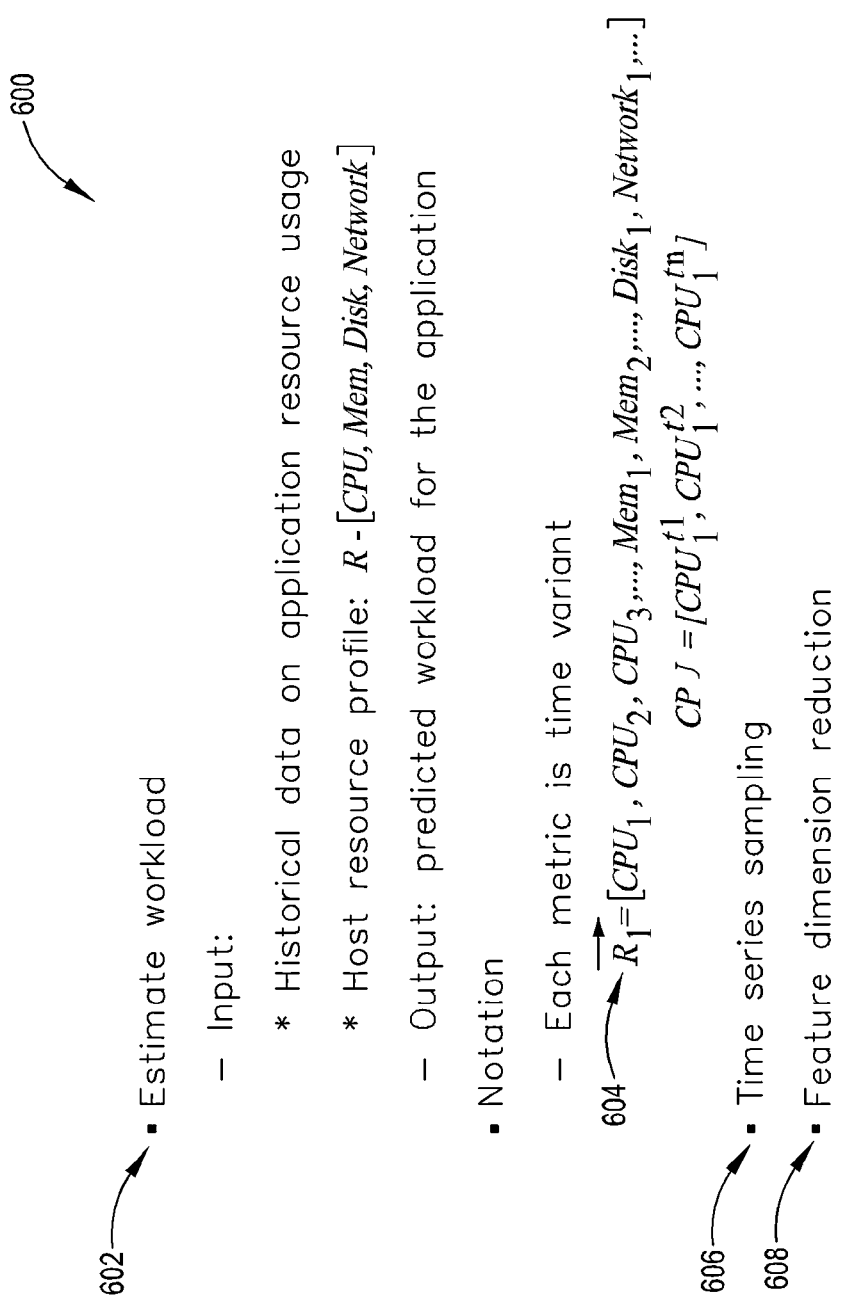
FIG. 6 shows the logic the WPPI system may use to determine the resource usage profile estimation.

FIG. 6 shows the logic 600 the WPPI system 102 may use to determine the resource usage profile estimation (166, 602). The resource usage profile estimation 166 of a workload (e.g., application's service) contains resource consumption metrics (e.g., resource utilization metrics 168, 604) of the VM assigned to the workload. The resource usage profile estimation 166 may be obtained by monitoring resource usage metrics while executing the workload (e.g., using vCenter™). For example, the resource usage metrics may include CPU usage %, CPU wait %, CPU system %, CPU reserved capacity %, memory usage, memory consumed, disk read, disk write, network bandwidth consumed, and network packets received. Each resource metric includes a time series (606) component that represents how the resource usage varies over the elapse of time. In order to estimate the resource usage profile of a service (e.g., workload), the WPPI system 102 may sample data points from the time series of each metric (e.g., one data point per increment of time). The WPPI system 102 sampling points represent the pattern of the time series. The sampling rate (e.g., feature dimension reduction 608) used by the WPPI system 102 is a tradeoff between accuracy and complexity (e.g., number of sampling points may be increased to improve the accuracy of the resource usage estimates or reduced in order to simplify the calculations for the model). The WPPI system 102 may apply a Kalman filter to predict the resource consumption of the service based on historical data. Kalman filter is a mathematical method that uses a series of measurements observed over time, containing noise (e.g., random variations) and other inaccuracies, and produce estimates that tend to be closer to the true un-profiled values than those values that would be based on a single measurement alone. The application (e.g., workload) execution time is the sum of the service execution time along the critical path for the workload.

The WPPI system 102 (e.g., workload resource estimation profiler 114 model) generates a resource vector (158, 604) of the metrics measured by the workload profiler. For example, the workload profiler 114 measures the one or more metrics identified with a particular sensitivity, criticality, or influence, or a combination thereof for meeting particular QoS guarantees. Some workloads may exhibit a workload signature identified as CPU-intensive, network bandwidth-intensive, memory-intensive, or a combination. By identifying the resource usage metrics with the sensitivity, criticality, or influence, or a combination thereof, the most statistically significant metrics may be measured and used to determine the workload signature (e.g., as CPU-intensive, network bandwidth-intensive, memory-intensive, or a combination thereof).

Figure 7:
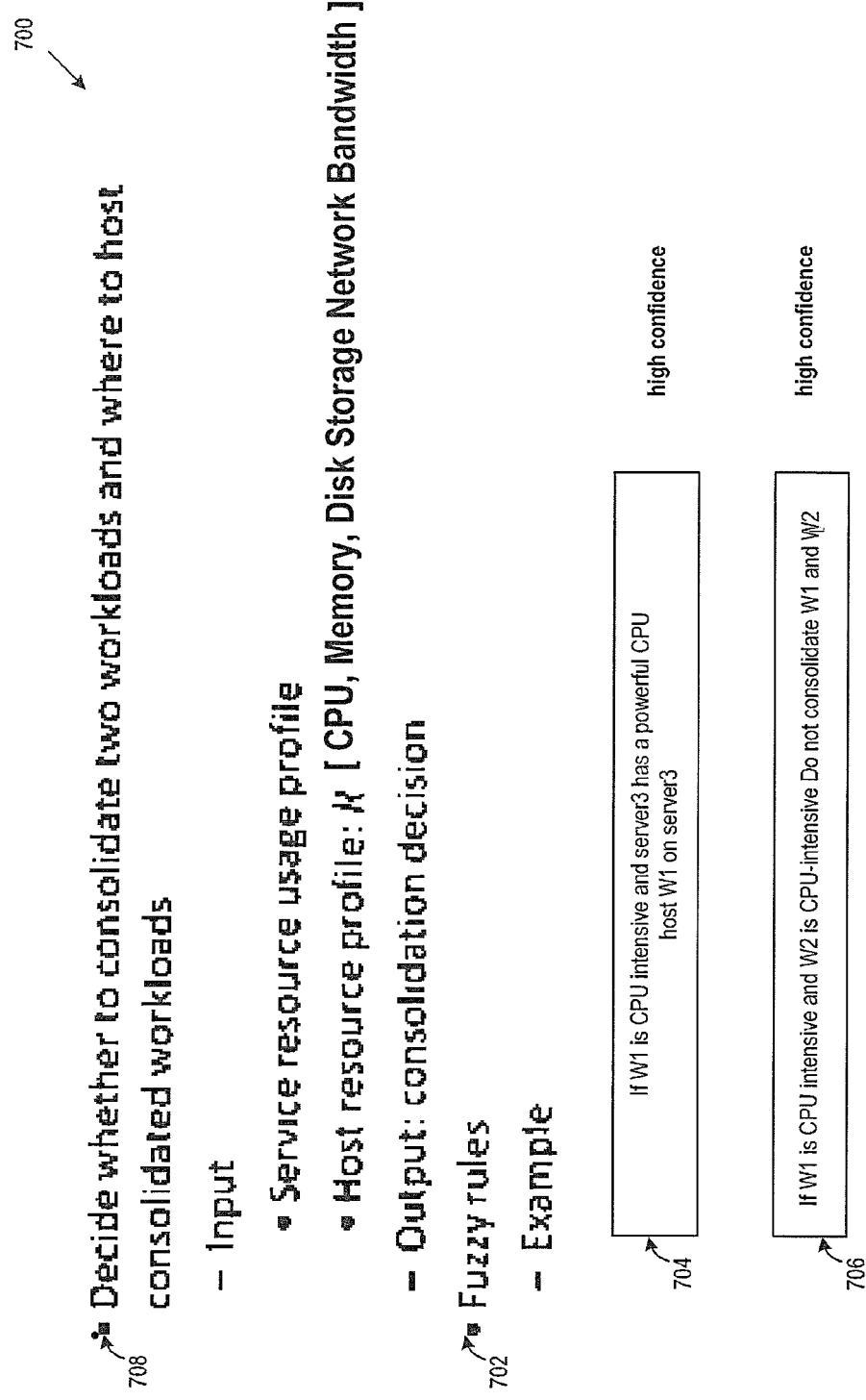
FIG. 7 shows the fuzzy logic the WPPI system may use to identify affiliation mapping for the resources to map to the workloads.

FIG. 7 shows the fuzzy logic (170, 702, 704, 706) the WPPI system 102 may use to identify affiliation mappings for the resources to map to the workloads. The WPPI system 102 may generate affiliation rules (708) such as whether consolidating application i and k onto server j will cause significant performance degradation. The WPPI system 102 may execute the application i (e.g., workload), App_i, on server j, Server_i and record the workload's execution time as T^j_i. For each pair of applications (e.g., workload) from the test suite, App_i and App_k, the WPPI system 102 consolidates the workloads onto server j. The execution time of each application (e.g., workload) is measured and the WPPI system 102 refers to execution times as T'^j_i and T'^j_k. The WPPI system 102 applies fuzzy logic to generate the rules. Information in the condition part includes service resource usage profile (e.g., as a time series) and the host resource profile. Information in the result part includes the performance degradation in terms of application execution time. The WPPI system 102 calculates a confidence probability for each fuzzy rule so that the affiliation rules provide guidance as to where to host application services (e.g., with or without consolidation).

The WPPI system 102 uses affiliation rules to assign the profiled workloads to actual physical resources based on known characteristics of the physical resources (e.g., amount and/or capacity of resources, types and capabilities of resources). When the WPPI system's 102 workload profiler 114 model determines the resource demand estimation 166, the resources utilization to achieve the QoS guarantee 126 for the workload may be known (e.g., the requirements for CPU, network bandwidth, and memory) and which resources exhibit with a particular sensitivity, criticality, or influence, or a combination thereof to achieve the QoS guarantee.

The WPPI system 102 includes affiliation rules that use fuzzy logic 170 to map one or more workloads to a cloud provider's available infrastructure that the WPPI system 102 determines satisfy desired QoS guarantees 126 for workloads of the cloud consumers. For example, a cloud provider 134 may provide two servers that may have similar or different resource capabilities (e.g., amount of disk storage, number of CPUs, random access memory (RAM)). The Affiliation rules identify one or more resource mapping (e.g., the optimal one or more ways to map the workload demand to the available resources) of workloads characterized based on the physical resources available to which to map the workloads.

The Affiliation rules use fuzzy logic 170 to apply rules that include a QoS guarantee probability value that identifies a confidence interval (174) or probability of success the workload will receive the resources to meet a corresponding workload QoS guarantee (e.g., completion time). For example, when a preferred destination (e.g., physical resource) to which to map the workload is specified, the Affiliation rules' fuzzy logic 170 may use the probability of meeting the corresponding workload QoS guarantee in order to determine whether to apply the destination preference. The Affiliation rules' fuzzy logic 170 may evaluate the guarantee probability value for each affiliation rule to determine the one or more rules to apply to meet the workload QoS guarantees of the workloads.

Performance modeling includes performing resource usage to service execution time relationship; The WPPI system 102 uses statistics (e.g., average and variance) of the sampled data points from the resource usage profile as input into a support vector machine (SVM) regressor to train the relationship between the resource usage and the service execution time. The WPPI system 102 performs a correlation test to filter out the dependent metrics, and may discard unimportant metrics in the regression. The performance interference model may use an influence matrix that translates the resource consumption of a new application (e.g., newly submitted consumer 136 un-profiled workload) to calculate the dilation factor for a current application (e.g., previously submitted workload), and captures the impact of resource contention 172 coming from all types of resources. The performance interference model estimates performance degradation due to workload consolidation, using as input the workload resource usage profile of a subject workload, and outputs performance estimates and time-variant resource usage (e.g., time series vector that identifies contention for resources such as CPU, memory, disk, and network) for each consolidated workload. The performance interference model may calculate confidence levels for the performance interference of the modeled workloads using Dynamic Bayesian Networks (DBN) that represents the performance interference as a time series sequence of variables (e.g., corresponding to time-variant resource usage of CPU, memory, disk, and network). The performance interference model may further use an influence matrix and fuzzy logic 170 to map the impact of collocating additional workloads with a current workload to observe the performance degradation.

FIG. 8 shows an influence matrix (116, 800) the WPPI system 102 may use to calculate a dilation factor (156, 802, 804) for a workload. The influence matrix is an M×M dimension matrix, where each row/column represents one of the filtered resource consumption metrics (e.g., CPU, memory, disk, and network). For example, the WPPI system 102 may calculate the impact of consolidating a second service (e.g., workload) on the same server (host) as a first service currently running on the host. The matrix element V_i,j is a coefficient which represents how much does the resource_i-resource_i contention between the first service and the second service (e.g., workloads) contributes to the dilation of resource consumption of the first service. Once the WPPI system 102 calculates the dilation (802, 804, 806, 810, 812, 814) estimate of resource consumption using the influence matrix, the WPPI system 102 may add the adjustment to the resource usage profile 806 of the first service. The WPPI system 102 uses the adjusted resource usage profile to predict the execution time of the first service and the second service (e.g., workloads) when consolidated on the same server (e.g., colocated workloads sharing resources).

The WPPI system 102 may use the influence matrix to calculate the dilation factor 802 to the resource consumption of the current application due to the consolidated application (e.g., workload) that will be colocated on the same host. Given an application App1, the WPPI system 102 refers to the resource usage profile $R_1$ 806 when App1 is running on a dedicated server. When the WPPI system 102 consolidates another application, App2, onto the same server, because of the potential resource contention 172 due to the consolidation, the performance of each application (e.g., workload) may be degraded 816.

The WPPI system 102 refers to the resource usage profile of App1 after consolidation as $R'_1$ 816 and the WPPI system 102 may calculate the resource usage profile 816 using the influence matrix M.

The influence matrix M is a m×m matrix where m is the number of metrics in the resource usage profile. Each row or column corresponds to a metric in $R_1$ 806. An element, $a_{ij}$, represents the impact coefficient of metric j on metric i. Take the first CPU metric for instance, the dilation factor, $d_{c_1}$, (808, 810) caused by the colocated application depends on the impact coming from all types of resources. For example, an application may have a resource usage profile 812 running on a dedicated server, assuming there are six metrics the WPPI system considers, including three CPU metrics, two memory metrics and one disk metric. Due to the resource contention 172 from the consolidated application, the resource usage profile has been dilated (814, 816). Then the new profile would be $R'_1$ 818 after applying the influence matrix.

The WPPI system 102 uses a test suite of applications (e.g., recognized workloads) covering the spectrum of resource usage characteristics (e.g., CPU-intensive, memory-intensive, disk-intensive, network-intensive). In each of the resource usage characteristics categories, the intensity may vary. For example, the CPU consumption percentage may vary from 10% to 100%. Take a consumer 136 submitted application, the WPPI system 102 first run the application (e.g., workload) separately and measures the application's (e.g., workload) resource usage profile as $R_1$ 806. The WPPI system 102 consolidates each of the applications in the test suite with the consumer 136 submitted application, and the WPPI system 102 denotes the new resource usage profile as 818 meaning that the WPPI system 102 colocated the consumer 136 submitted application with the $i^{th}$ application from the test suite.

The $d\_factor_i$ 804 provides the dilation factor vector. Applying the regression technique with y being a dilation factor 804 and X being the resource usage profile $R_1$ 806, the WPPI system 102 estimates the impact coefficients $a_{ij}$, which composes the influence matrix M. A pair of consolidated applications corresponds to an individual influence matrix as the resource contention 172 of the consolidated applications.

Accordingly, the performance degradation varies depending on workloads consolidated together, and the WPPI system 102 may group together application pairs that share similar influence matrices to reduce the number of matrices the WPPI system 102 generates and stores.

When the WPPI system 102 determines whether to colocate a new application (e.g., a consumer 136 newly submitted workload) with an existing application, the WPPI system 102 estimates the application's resource usage profile 166 using the resource estimation profiler 114. The WPPI system 102 compares the resource usage profile with the profiles of the existing applications from the test suite. The WPPI system 102 may choose K most similar resource profiles by using the normalized Euclidean distance, because different resource metrics are in different units. The WPPI system 102 may set k equal to 3, but k may be set as other values as well. A small value k impacts the accuracy of the estimated resource usage profile while a large value of k increases the estimation overhead. The WPPI system 102 applies the influence matrices that correspond to the three applications (e.g. workloads and/or workload types). The WPPI system 102 calculates an average of the three estimations as the final estimation of the workload resource usage profile of the new application. As an enhancement, when the new application presents a resource usage profile that the WPPI system 102 determines is different from the existing resource usage profiles, the WPPI system 102 trains the workload's corresponding influence matrix and adds the profile to a workload resource usage profile database so that the WPPI system 102 may use the stored workload resource usage profile to model other applications and determine consolidation strategies.

Figure 9:
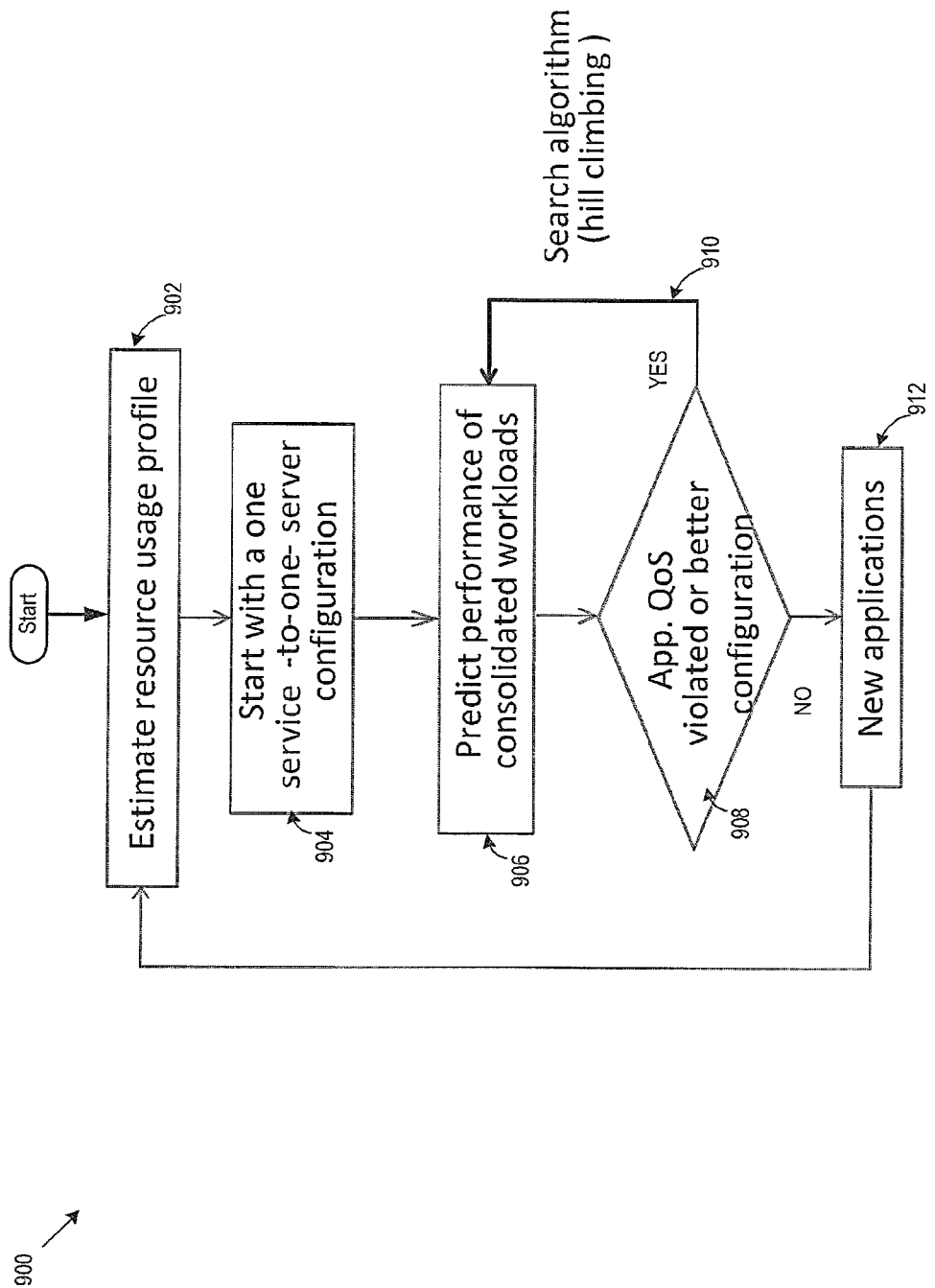
FIG. 9 shows the logic the WPPI system may use to optimize the number of workloads and maximize the revenue to the provider.

FIG. 9 shows the logic 900 the WPPI system 102 may use to optimize the number of workloads and maximize the revenue to the provider. The WPPI system 102 uses an online consolidation algorithm 138 to respond to real-time events. For every service (e.g., job, task, sub-workload) of an application (e.g., workload), the WPPI system 102 estimates the resource usage profile (902) using the trained resource estimation profiler. The WPPI system 102 maps one service onto one server (904) and applies the affiliation rules to identify the optimal and sub-optimal servers to use to host each service. The WPPI system 102 online consolidation algorithm 138 monitors services and adjusts the consolidation strategy, using the performance interference model to predict the performance degradation (906) so that the consolidation strategy implemented achieves the application QoS metric (e.g., response time deadline) guarantees (908). When the WPPI system 102 online consolidation algorithm 138 determines that a consolidation has a high probability of failing (910) to achieve the QoS metric guarantees or the provider's revenue can be increased, the WPPI system 102 online consolidation algorithm 138 applies a search algorithm (910) based on hill climbing to look for a better (e.g., one or more optimal) consolidation configuration. When the online consolidation algorithm determines that new applications have been submitted (912) to the cloud provider, the online consolidation algorithm estimates the resource usage profile for the new applications (902) and uses the WPPI system 102 to accommodate (e.g., consolidate or migrate) the new applications.

FIG. 10 shows virtual machine (VM) specifications 1000 the WPPI system 102 may use to determine workload consolidations and maximize cloud provider revenue. The VM specifications 1000 may include specifications for various resources (e.g., NGSA blades 1002, and Lab Blades 1 and 2—1004, 1006). The specifications for each resource may include CPU capacity 1008, memory capacity 1010, disk storage capacity 1012, and the type of operating system supported 1014.

FIG. 11 shows test suite workloads 1100 that exhibit recognized workload profiles (e.g., workload signatures 1102). The workload profiler 114 may be used for un-profiled workloads outside of the benchmark. The workload profiler 114 may use the SPEC2005™ as an example of an un-profiled workload to determine the workload profile for un-profiled workloads, and calibrate the workload profiler 114 and/or workload models. Using the recognized workloads assists the workload profiler 114 to model un-profiled workloads in advance and forecast changes (e.g., resource utilization requirements) over a time period based on how and what cloud consumers' workloads are characterized to use. The test suite includes recognized workloads and hardware infrastructure resource combinations. The WPPI system 102 may use one or more recognized workload with respective workload signatures (e.g., a recognized workload one of each workload signature type from multiple workload signature types). A network intensive workload signature type may include a file-transfer protocol (FTP) function that executes a file transfer the exhibits known characteristics (e.g., time series bandwidth requirements and storage requirements).

Figure 12:
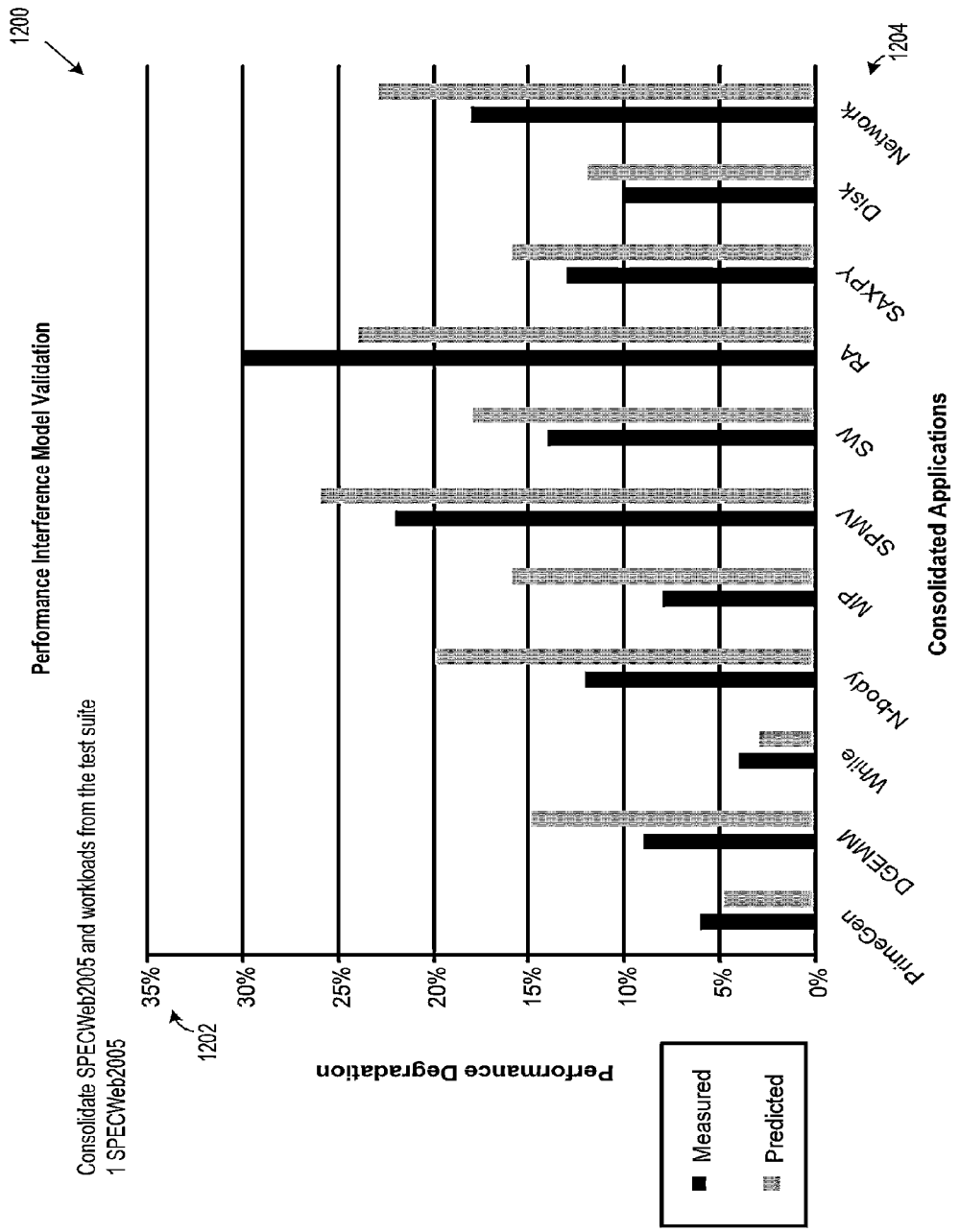
FIG. 12 shows performance interference model validation used by the WPPI system to calculate degradation of consolidated workloads.

FIG. 12 shows performance interference model validation 1200 used by the WPPI system 102 to calculate degradation 1202 of consolidated workloads 1204. The WPPI system 102 may execute a recognized workload (e.g., SPECWeb2005) as a background noise workload while forecasting the performance degradation (e.g., dilation factor) after consolidating each application from the test suite of recognized workloads. The WPPI system 102 reports the measured and predicted execution time to the cloud provider, and/or the cloud consumer 136 of the workload.

The performance interference model evaluates the probabilities of meeting the QoS guarantees of multiple permutations of workloads executed in combination (colocated and/or sharing hardware infrastructure resources). For example, the elapsed time may be compared for a first application to receive a requested for memory from an individual resource, with the elapsed time for the first application to receive the requested memory from the individual server when a second application also requests memory, something other than memory (e.g., disk storage or network bandwidth), or a combination. The applications may observe a slight degradation in service provided by the individual resource. Accordingly, depending on the server workloads with complimentary resource needs may be assigned to the individual resource, while other workloads with non-complimentary resource needs may be assigned to different resources (e.g., servers and/or hardware infrastructure resources). The performance interference model identifies dilation factors for multiple workloads sharing particular hardware infrastructure resources. The dilation identifies how much longer a workload may take to execute because of interference due to other workloads colocated and/or using shared resources.

Workload profiler 114 identifies the type of workload (workload signature) of the cloud consumer submitted workloads as the workloads are submitted. For example, a first application is CPU-intensive, a second application is a network bandwidth-intensive, and a third application is disk storage-intensive. The affiliation rules calculate the probabilities of meeting the QoS guarantees of each workload using permutations of mappings of physical infrastructure resources. In order to determine the mappings that optimize the number of workloads that are satisfied, or where a cost is associated with each workload, optimize the revenue that may be generated from processing the workloads, the performance interference model evaluates the probabilities for the permutations of workloads and hardware infrastructure resources in combination that meet the QoS guarantees of the workloads. Optimizing the number of workloads may include equally weighting the workloads' priority values, or weighting the workloads' priority values based on the revenue that may be generated from processing each workload, or a combination. For example the permutations of combinations of the three applications being assigned to the two resources (e.g., hardware infrastructure resources).

Figure 13:
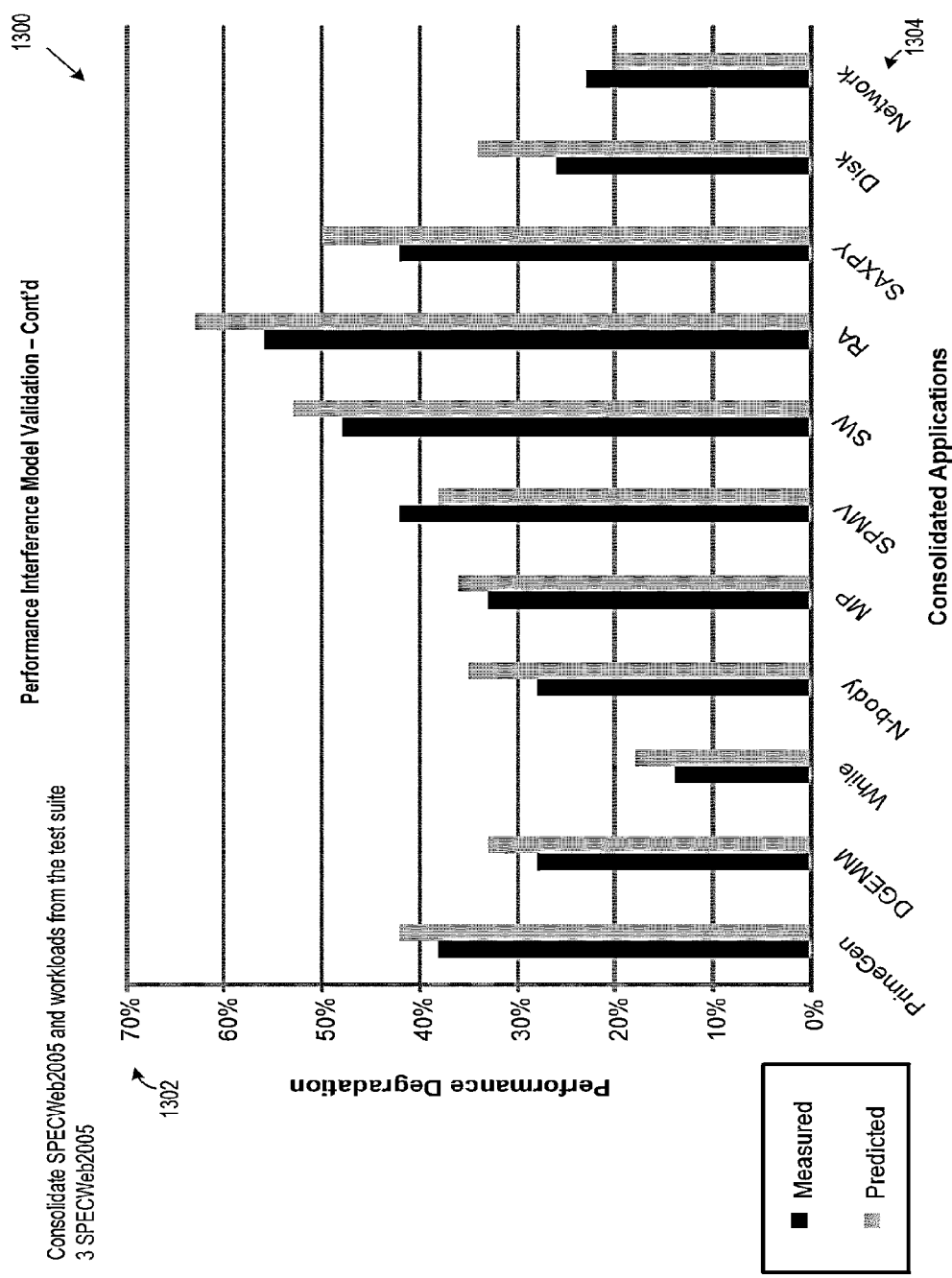
FIG. 13 shows another performance interference model validation used by the WPPI system to calculate degradation of consolidated workloads.

FIG. 13 shows another performance interference model validation 1300 used by the WPPI system 102 to calculate degradation 1302 of consolidated workloads 1304. However, instead of running one recognized workload (e.g., SPECWeb2005) as a background noise, the WPPI system 102 may run three recognized workloads' processes.

Figure 14:
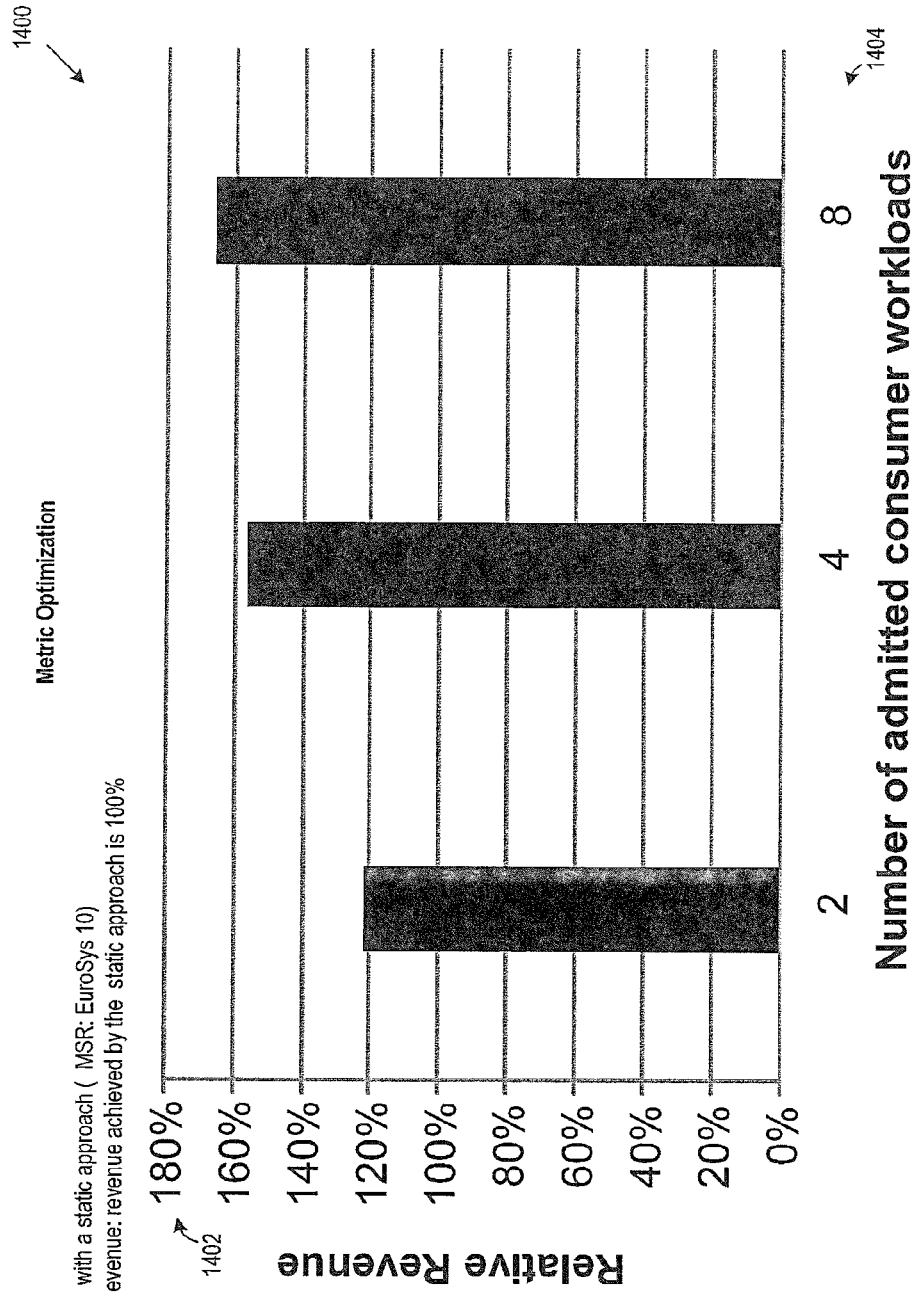
FIG. 14 shows analysis the WPPI system may generate to optimize the provider revenue.

FIG. 14 shows metric optimization analysis 1400 the WPPI system 102 may generate to optimize the provider revenue 1402 and number of workloads submitted 1404. The WPPI system 102 uses the outcome of the models (e.g., workload resource estimation profiler 114 model, the performance interference model and affiliation rules) to compute the various possible deployments (mappings) including sub-optimal mappings in order to identify the optimal one or more mappings to use deploy the cloud consumer submitted workloads (118, 120). Communicate the assignment to an automated cloud provider resource management system 162 to deploy the assignment (140, 138, 124).

Figure 15:
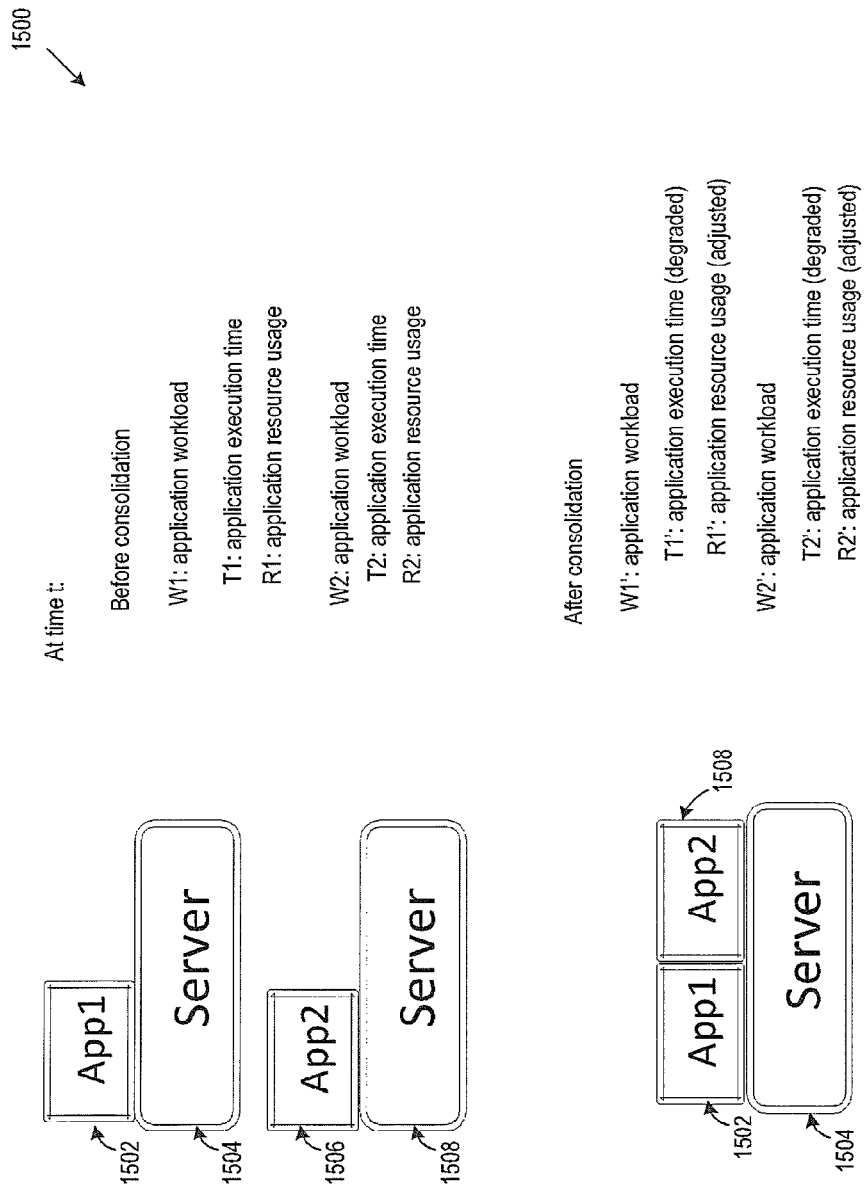
FIG. 15 shows workload mappings before and after a proposed workload consolidation.

FIG. 15 shows workload mappings 1500 before (1502-1504, 1506-1508) and after a proposed workload consolidation (1502-1508-1504).

FIG. 16 shows soft deadlines 1600 (e.g., QoS guarantees 126) for cloud consumer 136 submitted applications (e.g., workloads 1602, 1604, 1606). Cloud consumer 136 submits each application (e.g., workload 1602, 1604, 1606) with the QoS guarantees 126 (e.g., response time) including a deadline, either hard or soft (1602, 1604, 1606), and a priority ranking (1608, 1610, 1612) of importance that the application (e.g., workload) complete on time (1614, 1616, 1618). The WPPI system 102 provides cloud providers 134 a way to minimize resource utilization costs 142 and maximize revenue 128 (1620). For example, the WPPI system 102 may analyze three applications submitted to two cloud providers, and evaluate random assignments versus model-base assignments, and execute the applications (e.g., workloads) and displays the observations (1622, 1624, 1626) (e.g., CPU, disk, memory, network utilizations). The WPPI system 102 identifies for each provider the resource usage and resource cost.

Figure 17:
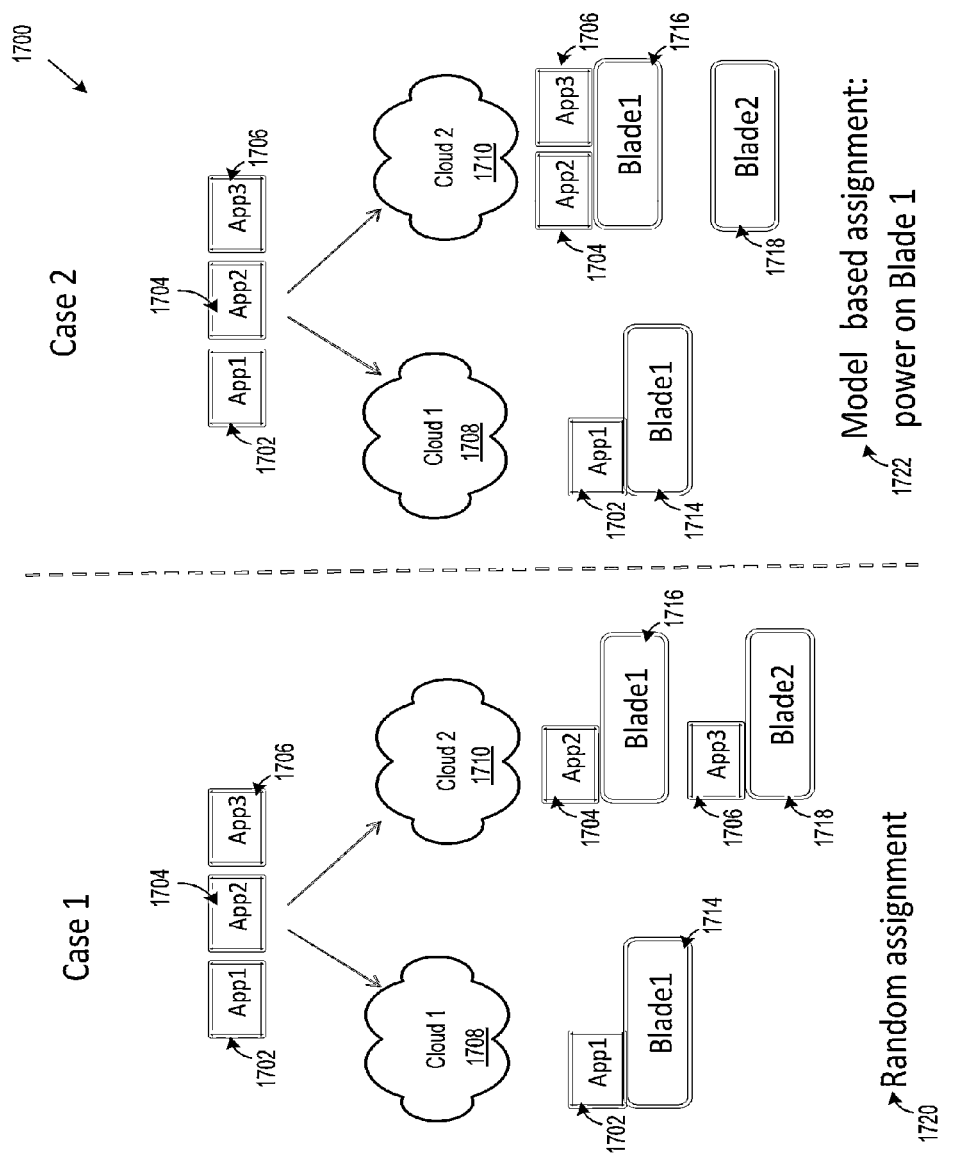
FIG. 17 shows consolidation permutations determined by the WPPI system for multiple cloud consumer submitted applications

FIG. 17 shows consolidation permutations 1700 determined by the WPPI system 102 for multiple cloud consumer submitted applications (e.g., workloads 1702, 1704, 1706). The first cloud provider 1708 may provide one blade (1712) and two virtual machines (VMs) for a cost of $10 per hour, while the second cloud provider 1710 may provide two blades (1714, 1716) and eight virtual machines (VMs) (e.g., four VMs per blade) for a cost of $8 per hour. In the random assignment case (case 1—1720), all three servers (1714, 1716, 1718) are used. In the model-based assignment case (case 2—1722), app2 1704 and app3 1706 are consolidated onto a server so that 2 out of 3 servers (1714, 1716) are up and running.

Figure 18:
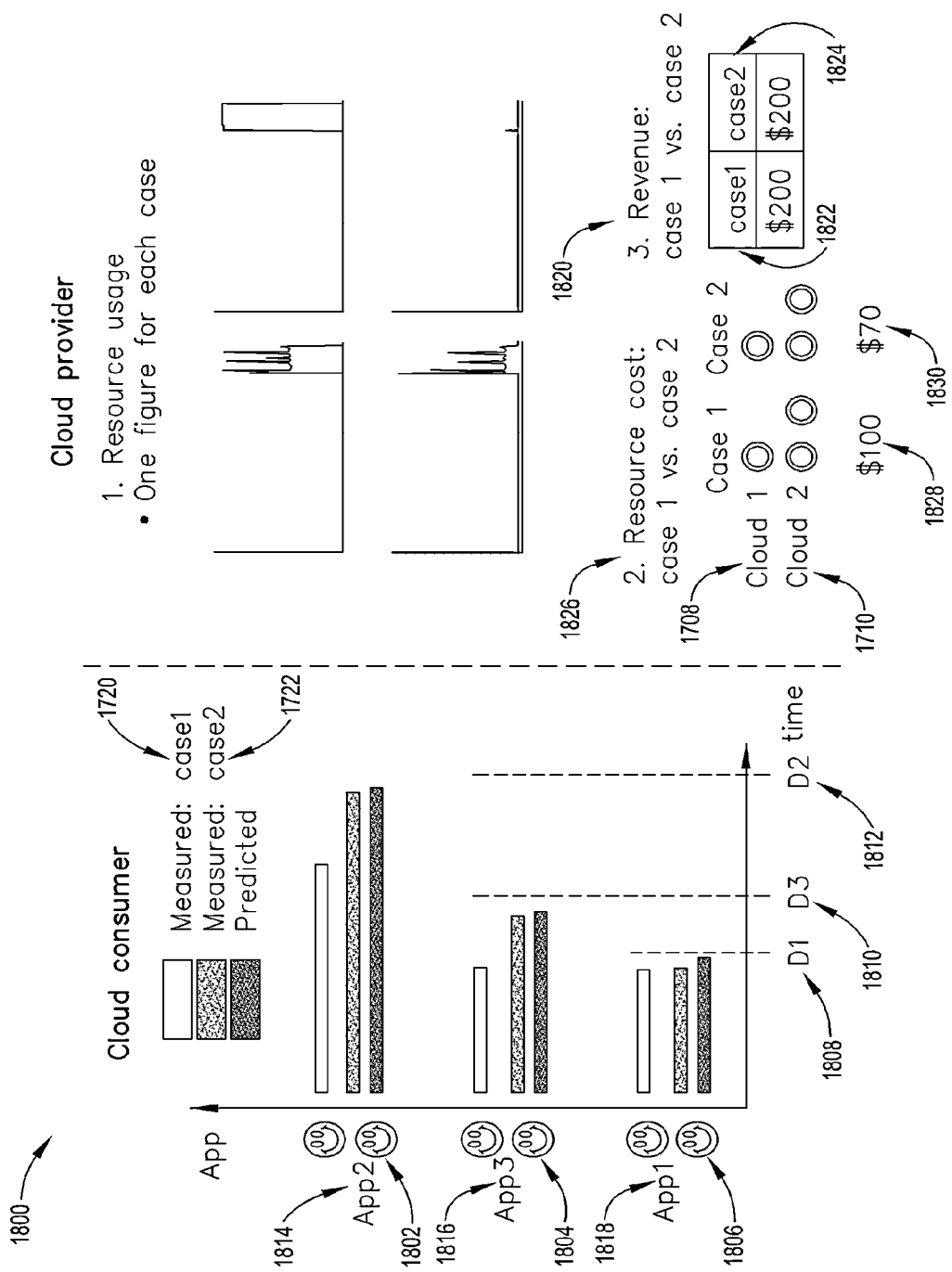
FIG. 18 shows visual indicators indicating whether a consolidation strategy satisfies the workloads' QoS guarantee.

FIG. 18 shows visual indicators 1800 indicating whether a consolidation strategy satisfies the workloads' QoS guarantee. A graphical representation (e.g., happy faces 1802, 1804, 1806) indicates whether the application meets the time deadline (1808, 1810, 1812) for the application (e.g., workloads 1814, 1816, 1818). In case 1, the measured time is reported, while in case 2, the WPPI system 102 reports both the measured time as well as execution time predicted from the WPPI system 102 model. Neither of the assignments violates deadlines of the applications. In case 1, resources are underutilized, and resource costs (1826, 1828, 1830) are higher because case 1 uses 3 servers. The WPPI system 102 may indicate cloud provider revenue graphically (1820, 1822, 1824) (e.g., as happy faces for revenue or sad faces for loss) to indicate whether an assignment achieves the provider's revenue goals. The WPPI system 102 determines for case 1 and case 2 the same amount of revenue may be realized for the cloud provider.

Figure 19:
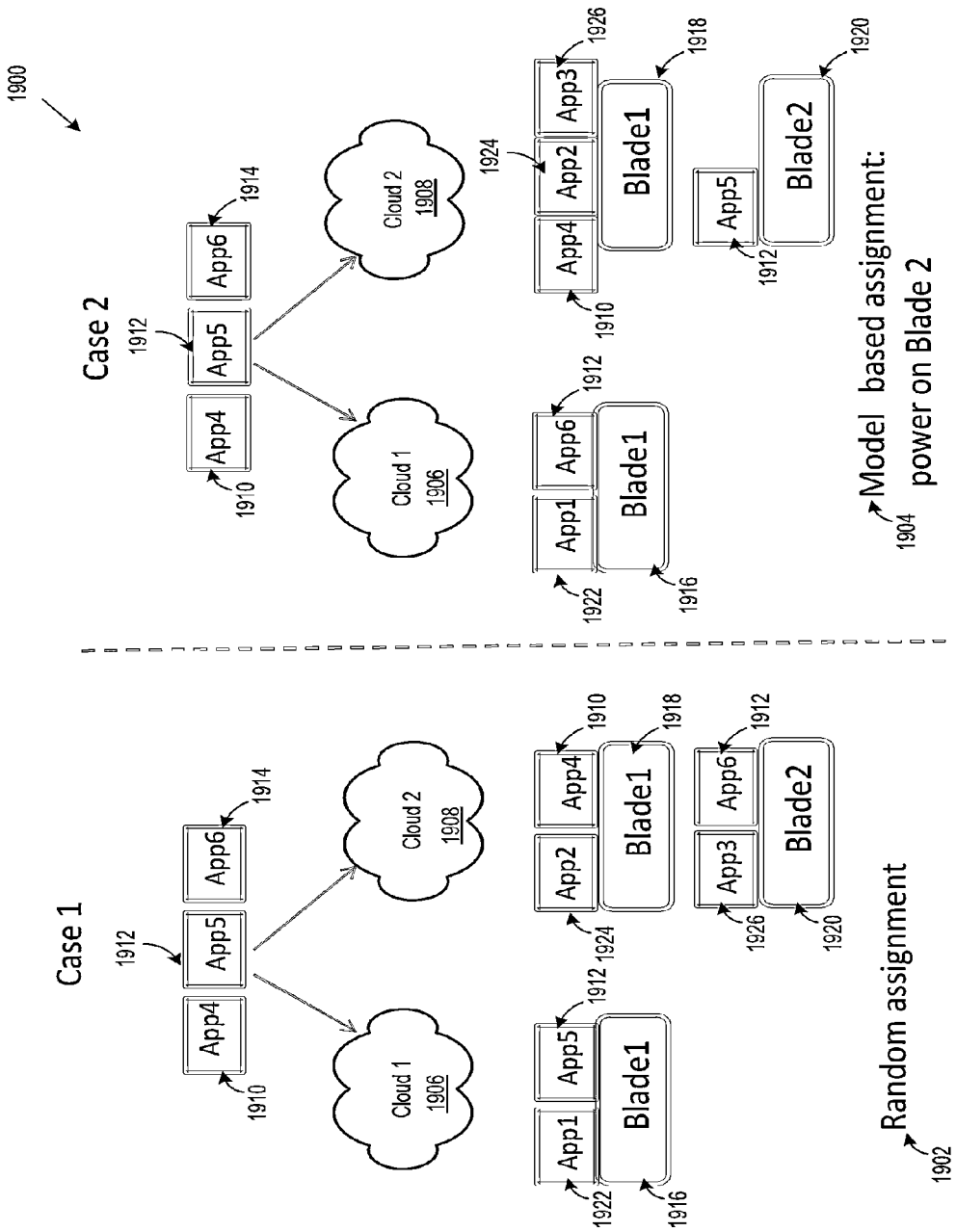
FIG. 19 shows additional applications submitted to the WPPI system to determine a consolidation strategy.

FIG. 19 shows additional applications submitted 1900 to the WPPI system 102 to determine a consolidation strategy. In both cases (1902, 1904), the cloud providers (1906, 1908) are trying to accommodate all newly submitted applications (1910, 1912, 1914), using three servers (1910, 1912, 1914).

Figure 20:
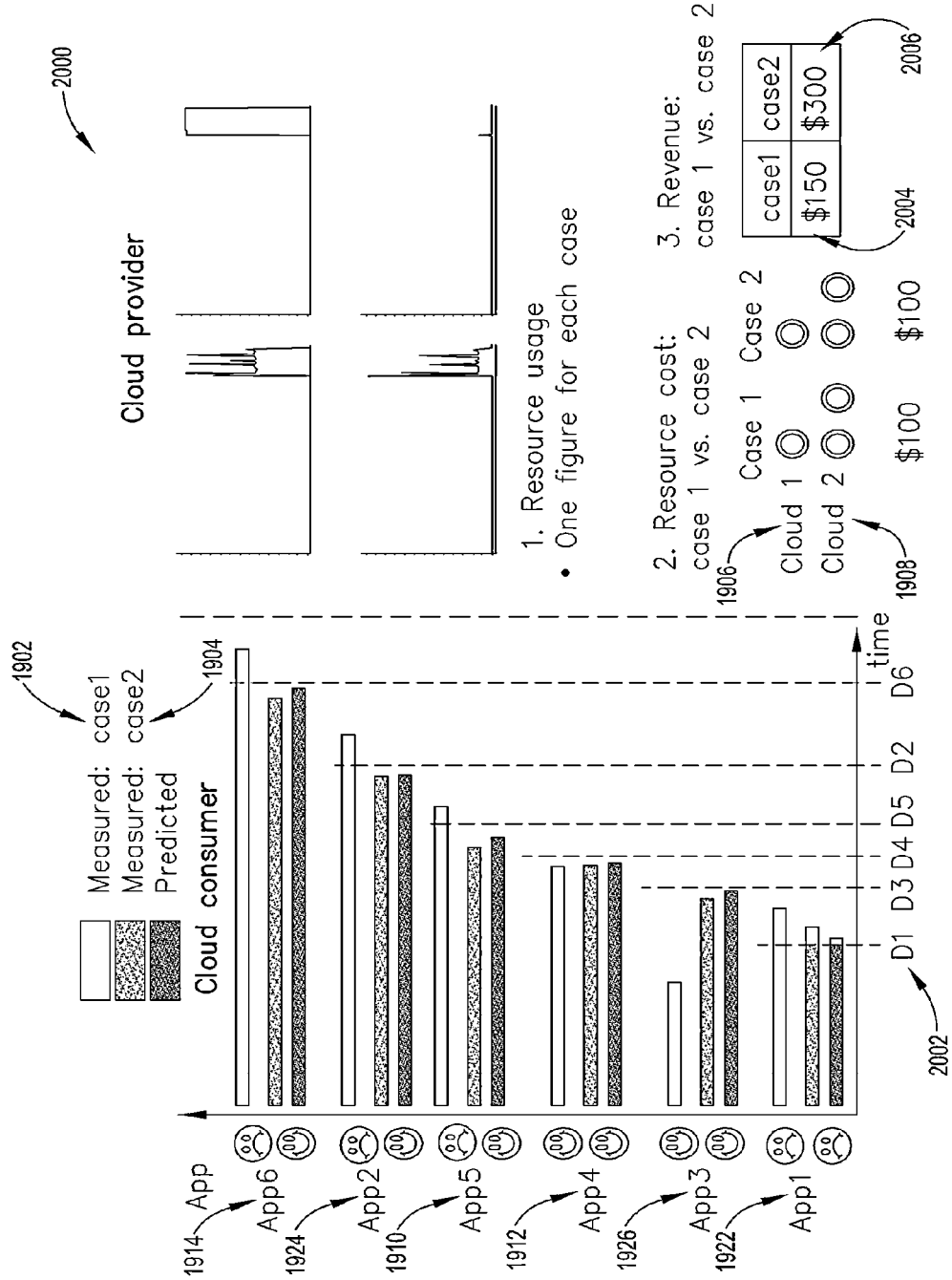
FIG. 20 shows consolidation strategies where at least one of the cloud consumer submitted workloads fails to meet the workloads' QoS guarantee.

FIG. 20 shows consolidation strategies 2000 where at least one of the cloud consumers' submitted workloads fails to meet the workloads' QoS guarantee (2002). In case 1 (1902), the WPPI system 102 determines that the consolidation/assignments miss the respective deadlines of app1 (1922), app2 (1924), app5 (1910) and app6 (1914) (4 out of 6 applications). While in case 2 (1904), the WPPI system 102 determines the consolidation/assignments that violate the deadline for app1 (1922), and case 1 makes less revenue (2004) compared to case 2 revenue (2006).

Figure 21:
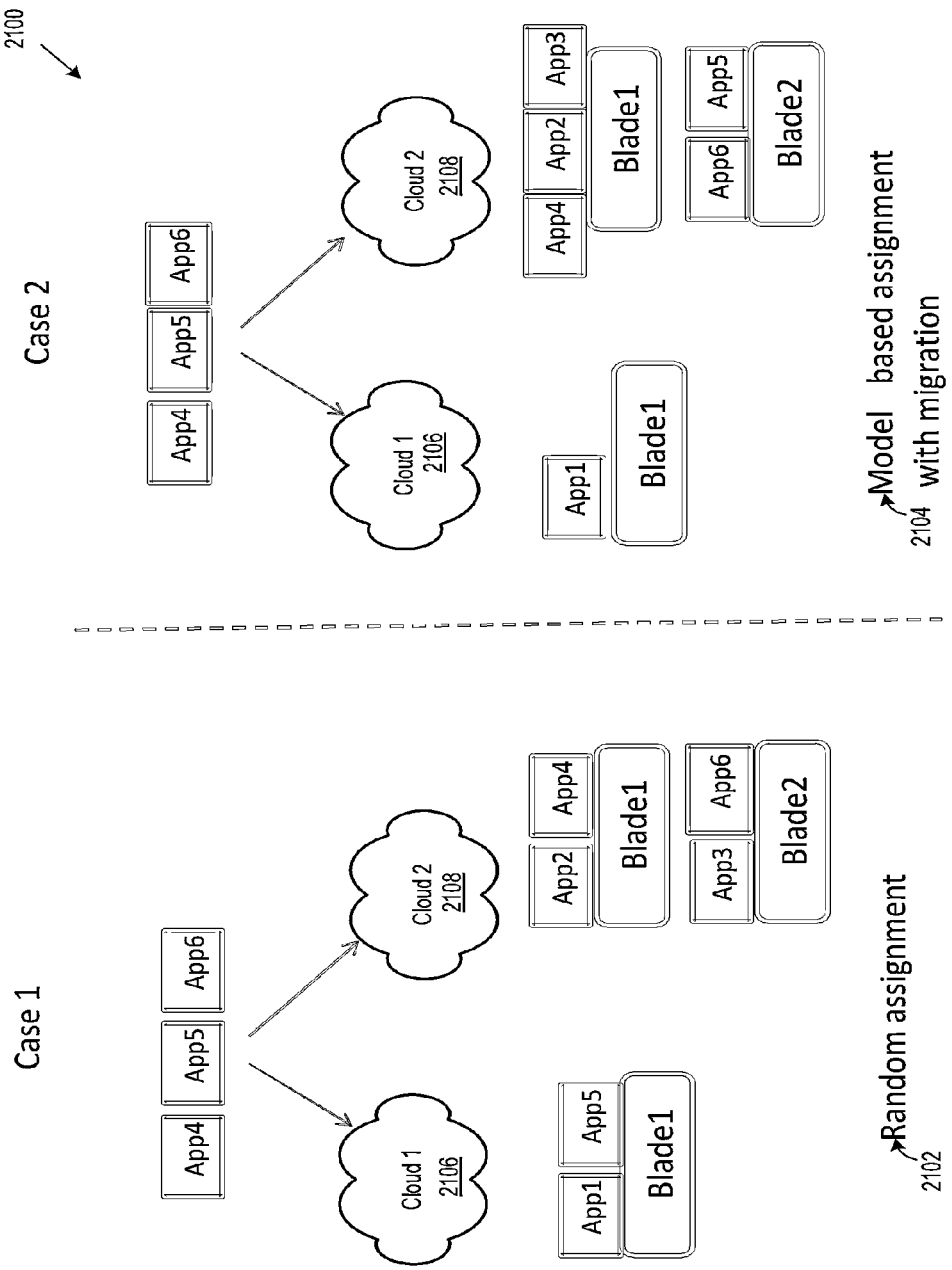
FIG. 21 shows a consolidation and workload migration strategy that satisfies the cloud consumer submitted workloads' QoS guarantees, and maximizes revenue for the cloud provider.

FIG. 21 shows a consolidation and workload migration strategy 2100 that satisfies the cloud consumer submitted workloads' QoS guarantees 126, and maximizes revenue for the cloud provider (e.g., case 1-2102 versus case 2-2104).

Figure 22:
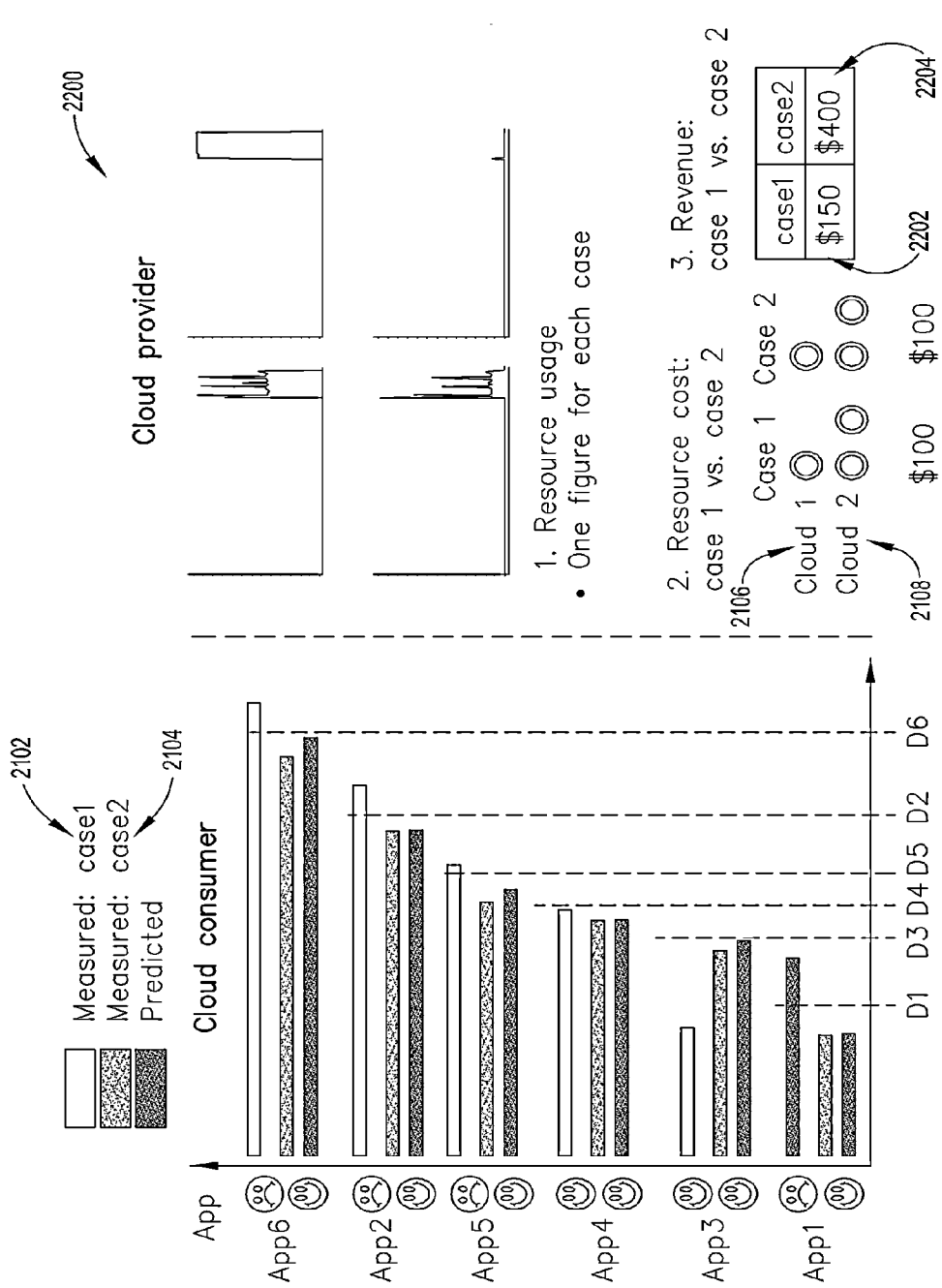
FIG. 22 shows the consolidation strategy of case 2 that satisfies the cloud consumer submitted workloads' QoS guarantees, and maximizes revenue for the cloud provider.

FIG. 22 shows a graphical representation 2200 of the completion times for the cloud consumer submitted workloads' QoS guarantees and the maximized revenue (2204) versus revenue (2202) for the cloud provider.

The WPPI system 102 may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (FDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network muter, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for managing consolidated workloads, comprising:
   storing, in a memory, recognized workload resource estimation profiles for recognized workloads wherein the recognized workloads cover different resource usage profiles of applications;
   receiving, through a network accessed by a processor coupled to the memory, a first workload submitted for execution using one or more resources of one or more cloud providers;
   generating, using the processor coupled to the memory, a workload resource estimation profile for the first workload using a workload resource estimation profiler model wherein the workload resource estimation profile includes a time series resource profile vector;
   calculating, using affiliation rules, one or more resource assignments for a first workload type to map the first workload type to the one or more resources;
   using a performance interference model to measure the first workload for each of one or more consolidation permutations of the first workload with each of the recognized workloads using the one or more resources;
   forecasting, using an influence matrix, first workload resource utilizations of the one or more resources for the first workload by applying the influence matrix to the first workload to obtain a first workload resource utilizations forecast;
   determining by a consolidation algorithm, using the first workload resource utilizations of the one or more resources for the first workload, whether a probability of a deployable consolidation permutation satisfies a Quality of Service (QoS) guarantee for the first workload type and satisfies a revenue goal of at least one of the one or more cloud providers, and when the consolidation algorithm determines that the probability of the deployable consolidation permutation fails to satisfy the Quality of Service (QoS) guarantee for the first workload type or the revenue goal of the at least one of the one or more cloud providers, then forecasting a second workload resource utilizations for the first workload;
   providing the one or more consolidation permutations of the first workload, including the deployable consolidation permutation, to at least one of the one or more cloud providers; and
   calculating a confidence interval for each of the one or more resource assignments that identify a second probability of the one or more resource assignments satisfying a Quality of Service (QoS) guarantee for the first workload type.

2. The method of claim 1, further comprising: deploying at least one of the one or more consolidation permutations of the first workload type when the probability of the deployable consolidation permutation satisfies the Quality of Service (QoS) guarantee for the first workload type and the revenue goal of the at least one of the one or more cloud providers.

3. The method of claim 1, further comprising:
   training the workload resource estimation profiler model using the recognized workload resource estimation profiles.

4. The method of claim 1, wherein calculating the one or more resource assignments for the first workload type further comprises:
   calculating a cost to the at least one of the one or more cloud providers for each of the one or more resource assignments.

5. The method of claim 1, further comprising:
   training, using recognized workload resource profile vectors for the recognized workloads, the performance interference model by calculating the one or more consolidation permutations of the recognized workload types mapped to the one or more resources.

6. The method of claim 1, wherein the determining by the consolidation algorithm, using the first workload resource utilizations of the one or more resources for the first workload, whether the probability of the deployable consolidation permutation satisfies the Quality of Service (QoS) guarantee for the first workload type and satisfies the revenue goal of the at least one of the one or more cloud providers, comprises:
   evaluating the deployable consolidation permutation by:
      equally weighting priority values for the first workload type, other workload types, or the recognized workload types or weighting the priority values for the first workload type, the other workload types, or the recognized workload types or the combination thereof on the one or more resources based on forecasted revenue from each of the first workload type, the other workload types, or the recognized workload types.

7. The method of claim 1, further comprising,
calculating a second workload resource profile vector for the first workload, or calculating other one or more consolidation permutations of the first workload, or a combination thereof; and
providing the other one of the consolidation permutations of the first workload to the cloud provider, when the other one of the consolidation permutations of the first workload is calculated.

8. The method of claim 1, wherein the different resource usage profiles of the applications comprises the applications that are at least one of: CPU-intensive, memory-intensive, disk storage-intensive, and network-intensive.

9. A system comprising a workload profiler and performance interference (WPPI) system for managing consolidated workloads comprising:
one or more processors coupled with a memory and instructions stored in the memory of the WPPI system that store, recognized workload resource estimation profiles for recognized workloads wherein the recognized workloads cover a spectrum of different resource usage profiles of applications;
wherein the instructions when executed by the one or more processors cause the one or more processors to:
receive, through a network accessed by the one or more processors coupled to the memory, a first workload submitted for execution using one or more resources of one or more cloud providers;
generate, by the WPPI system, a workload resource estimation profile for the first workload using a workload resource estimation profiler model wherein the workload resource estimation profile includes a time series resource profile vector;
calculate, by the WPPI system, using affiliation rules, one or more resource assignments for a first workload type to map the first workload type to the one or more resources;
use, by the WPPI system, a performance interference model to measure the first workload for each of one or more consolidation permutations of the first workload with each of the recognized workloads using the one or more resources;
forecast, by the WPPI system, using an influence matrix, first workload resource utilizations of the one or more resources for the first workload by applying the influence matrix to the first workload to obtain a first workload resource utilizations forecast;
determine, by a consolidation algorithm executing on the one or more processor of WPPI system, using the first workload resource utilizations of the one or more resources for the first workload, whether a probability of a deployable consolidation permutation satisfies a Quality of Service (QoS) guarantee for the first workload type and satisfies a revenue goal of at least one of the one or more cloud providers, and when the consolidation algorithm determines that the probability of the deployable consolidation permutation fails to satisfy the Quality of Service (QoS) guarantee for the first workload type or the revenue goal of the at least one of the one or more cloud providers, then forecast a second workload resource utilizations for the first workload;
provide the one or more consolidation permutations of the first workload, including the deployable consolidation permutation, to at least one of the one or more cloud providers; and
calculate a confidence interval for each of the one or more resource assignments that identify a second probability of the one or more resource assignment, satisfying a Quality of Service (QoS) guarantee for the first workload type.

10. The system of claim 9, wherein the instructions when executed further cause the one or more processors to:
deploy at least one of the one or more consolidation permutations of the first workload type when the probability of the deployable consolidation permutation satisfies the Quality of Service (QoS) guarantee for the first workload type and the revenue goal of the at least one of the one or more cloud providers.

11. The system of claim 9, wherein the instructions when executed further cause the one or more processors to:
train the workload resource estimation profiler model using the recognized workload resource estimation profiles.

12. The system of claim 9, wherein the instructions when executed cause the one or more processors to calculate the one or more resource assignments for the first workload type and further cause the one or more processors to:
calculate a cost to the at least one of the one or more cloud providers for each of the one or more resource assignments.

13. The system of claim 9, wherein the instructions when executed further cause the one or more processors to:
train, using recognized workload resource profile vectors for the recognized workloads, the performance interference model by calculating the one or more consolidation permutations of the recognized workload types mapped to the one or more resources.

14. The system of claim 9, wherein the instructions when executed cause the one or more processors to determine, using the first workload resource utilizations of the resource for the first workload, whether the probability of the deployable consolidation permutation satisfies the Quality of Service (QoS) guarantee for the first workload type and satisfies the revenue goal of the at least one of the one or more cloud providers, further cause the one or more processors to:
evaluate the deployable consolidation permutation by:
equally weighting priority values for the first workload type, the other workload types, or the recognized workload types, or
weighting the priority values for the first workload type, the other workload types, or the recognized workload types or the combination thereof on the one or more resources based on forecasted revenue from each of the first workload type, the other workload types, or the recognized workload types.

15. The system of claim 9, wherein the instructions when executed further cause the one or more processors to:
calculate a second workload resource profile vector for the first workload, or calculate other one or more consolidation permutations of the first workload, or a combination thereof; and
provide the other one of the consolidation permutations of the first workload to the cloud provider, when the other one of the consolidation permutations of the first workload is calculated.

16. The system of claim 9, wherein the different resource usage profiles of the applications comprises the applications that are at least one of: CPU-intensive, memory-intensive, disk storage-intensive, and network-intensive.

* * * * *